(12) United States Patent
Mutafopulos

(10) Patent No.: US 11,701,658 B2
(45) Date of Patent: Jul. 18, 2023

(54) SYSTEMS AND METHODS FOR MICROFLUIDIC PARTICLE SELECTION, ENCAPSULATION, AND INJECTION USING SURFACE ACOUSTIC WAVES

(71) Applicant: President and Fellows of Harvard College, Cambridge, MA (US)

(72) Inventor: Kiryakos Spiro Mutafopulos, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 218 days.

(21) Appl. No.: 16/989,570

(22) Filed: Aug. 10, 2020

(65) Prior Publication Data

US 2021/0039105 A1    Feb. 11, 2021

Related U.S. Application Data

(60) Provisional application No. 62/885,000, filed on Aug. 9, 2019.

(51) Int. Cl.
*B01L 3/00* (2006.01)
*G01N 15/14* (2006.01)
*G01N 15/10* (2006.01)

(52) U.S. Cl.
CPC ... *B01L 3/502769* (2013.01); *B01L 3/502761* (2013.01); *G01N 15/1404* (2013.01);
(Continued)

(58) Field of Classification Search
CPC ......... B01L 3/502769; B01L 3/502761; B01L 2200/0652; B01L 2300/0861;
(Continued)

(56) References Cited

U.S. PATENT DOCUMENTS 5,164,094 A   11/1992  Stuckart
5,512,131 A    4/1996  Kumr et al.
(Continued)

FOREIGN PATENT DOCUMENTS

CN    101099727 A    1/2008
CN    102120585 A    7/2011
(Continued)

OTHER PUBLICATIONS

Extended European Search Report dated for Application No. 11820522.8 dated Oct. 13, 2017.
(Continued)

*Primary Examiner* — Michael McCullough
*Assistant Examiner* — Jessica L Burkman
(74) *Attorney, Agent, or Firm* — Wolf, Greenfield & Sacks, P.C.

(57) ABSTRACT

This relates to acoustic microfluidic systems that can generate emulsions/droplets or encapsulate particles of interest (including mammalian cells, bacteria cells, or other cells) into droplets upon detection of the particles of interest flowing in a stream of particles. The systems operate on the detect/decide/deflect principle wherein the deflection step, in a single operation, not only deflects particles of interest from a stream of particles but also encapsulates the particles of interest in an emulsion droplet. The microfluidic systems have an abrupt transition in the channel geometry from a shorter channel to a taller channel (i.e., in the shape of a 'step') to break the stream of the dispersed phase into a droplet upon acoustic actuation. When there is no acoustic wave present, no droplets/emulsions are generated and the stream of particles proceeds uninterrupted. The rapid actuation and post-actuation recovery employed by the microfluidic systems taught herein ensure that the vast majority of selected particles are properly deflected, that few or no
(Continued)

empty droplets are produced, and that total throughput remains high.

22 Claims, 18 Drawing Sheets

(52) U.S. Cl.
CPC .... *G01N 15/1484* (2013.01); *B01L 2200/027* (2013.01); *B01L 2200/0652* (2013.01); *B01L 2300/0627* (2013.01); *B01L 2300/0861* (2013.01); *B01L 2400/0436* (2013.01); *G01N 2015/1006* (2013.01); *G01N 2015/142* (2013.01); *G01N 2015/149* (2013.01)

(58) Field of Classification Search
CPC ..... B01L 2300/0627; B01L 2400/0436; G01N 15/1404; G01N 15/1484; G01N 2015/1006; G01N 2015/142; G01N 2015/149

See application file for complete search history.

(56) References Cited

U.S. PATENT DOCUMENTS

| | | | |
|---|---|---|---|
| 5,688,405 | A | 11/1997 | Dickinson et al. |
| 6,355,198 | B1 | 3/2002 | Kim et al. |
| 6,777,245 | B2 | 8/2004 | Wixforth |
| 6,852,547 | B2 | 2/2005 | Garcia et al. |
| 7,708,949 | B2 | 5/2010 | Stone et al. |
| 7,942,568 | B1 | 5/2011 | Branch et al. |
| 8,122,909 | B2 | 2/2012 | Tonkovich et al. |
| 8,573,060 | B2 | 11/2013 | Huang et al. |
| 8,765,485 | B2 | 7/2014 | Link et al. |
| 9,038,919 | B2 | 5/2015 | Link et al. |
| 9,063,132 | B2 * | 6/2015 | Dilleen ............ G01N 33/54326 |
| 9,512,421 | B1 * | 12/2016 | Branch .................. G01N 29/02 |
| 9,597,692 | B2 | 3/2017 | Bernate et al. |
| 9,695,390 | B2 | 7/2017 | Weitz et al. |
| 10,258,987 | B2 | 4/2019 | Weitz et al. |
| 10,570,361 | B2 | 2/2020 | Weitz et al. |
| 10,758,905 | B2 * | 9/2020 | Ai ..................... B01L 3/502761 |
| 11,040,347 | B2 * | 6/2021 | Foster ............... B01L 3/502738 |
| 11,077,441 | B2 * | 8/2021 | Craig ................. G01N 15/1484 |
| 11,084,036 | B2 * | 8/2021 | Bharadwaj ........ B01L 3/502776 |
| 2001/0055529 | A1 | 12/2001 | Wixforth |
| 2002/0009015 | A1 | 1/2002 | Laugharn et al. |
| 2003/0064400 | A1 | 4/2003 | Williams et al. |
| 2004/0069717 | A1 | 4/2004 | Laurell et al. |
| 2004/0126903 | A1 | 7/2004 | Garcia et al. |
| 2004/0266022 | A1 | 12/2004 | Sundararajan et al. |
| 2005/0148064 | A1 | 7/2005 | Yamakawa et al. |
| 2005/0172476 | A1 | 8/2005 | Stone et al. |
| 2005/0207940 | A1 | 9/2005 | Butler et al. |
| 2006/0163385 | A1 | 7/2006 | Link et al. |
| 2006/0266692 | A1 | 11/2006 | Foster et al. |
| 2007/0003442 | A1 | 1/2007 | Link et al. |
| 2007/0017633 | A1 | 1/2007 | Tonkovich et al. |
| 2007/0125941 | A1 | 6/2007 | Lee et al. |
| 2007/0206055 | A1 | 9/2007 | Zapka et al. |
| 2007/0263485 | A1 | 11/2007 | Yang et al. |
| 2009/0107909 | A1 | 4/2009 | Kotera et al. |
| 2009/0201504 | A1 | 8/2009 | Ho et al. |
| 2009/0226994 | A1 | 9/2009 | Lemor et al. |
| 2010/0126922 | A1 | 5/2010 | Takahashi et al. |
| 2010/0139377 | A1 | 6/2010 | Huang et al. |
| 2010/0200092 | A1 | 8/2010 | Beltram et al. |
| 2010/0248064 | A1 | 9/2010 | La O'et al. |
| 2010/0300942 | A1 | 12/2010 | Sulchek et al. |
| 2010/0323342 | A1 | 12/2010 | Gonzalez-Gomez et al. |
| 2011/0032528 | A1 | 2/2011 | Charette |
| 2011/0127164 | A1 | 6/2011 | Sinha et al. |
| 2011/0154890 | A1 | 6/2011 | Holm et al. |
| 2011/0275143 | A1 | 11/2011 | Prakash et al. |
| 2011/0277848 | A1 | 11/2011 | Burns et al. |
| 2012/0145890 | A1 | 6/2012 | Goodlett et al. |
| 2012/0146457 | A1 | 6/2012 | Goto et al. |
| 2012/0149126 | A1 | 6/2012 | Wilson et al. |
| 2012/0160746 | A1 | 6/2012 | Thorslund et al. |
| 2012/0315203 | A1 | 12/2012 | Baroud et al. |
| 2013/0043170 | A1 | 2/2013 | Rose et al. |
| 2013/0192958 | A1 | 8/2013 | Ding et al. |
| 2013/0213488 | A1 | 8/2013 | Weitz et al. |
| 2013/0236901 | A1 | 9/2013 | Potier et al. |
| 2014/0008307 | A1 | 1/2014 | Guldiken et al. |
| 2014/0033808 | A1 | 2/2014 | Ding et al. |
| 2014/0161685 | A1 | 6/2014 | Lee et al. |
| 2014/0174994 | A1 | 6/2014 | Bemate et al. |
| 2014/0227777 | A1 | 8/2014 | Choi et al. |
| 2015/0024373 | A1 | 1/2015 | Xi et al. |
| 2015/0114093 | A1 | 4/2015 | Appleyard et al. |
| 2015/0192546 | A1 | 7/2015 | Weitz et al. |
| 2015/0298157 | A1 | 10/2015 | Weitz et al. |
| 2017/0246634 | A1 | 8/2017 | Weitz et al. |
| 2017/0321177 | A1 | 11/2017 | Weitz et al. |
| 2018/0257076 | A1 | 9/2018 | Weitz et al. |
| 2019/0211293 | A1 | 7/2019 | Weitz et al. |
| 2022/0212194 | A1 | 7/2022 | Weitz et al. |

FOREIGN PATENT DOCUMENTS

| | | |
|---|---|---|
| CN | 104195028 A | 12/2014 |
| EP | 1398025 A1 | 3/2004 |
| EP | 1 905 427 A1 | 4/2008 |
| EP | 2014280 A1 | 1/2009 |
| JP | H02-503528 T | 10/1990 |
| JP | 7304997 A | 11/1995 |
| JP | H10-082723 A | 3/1998 |
| JP | 2004-085323 A | 3/2004 |
| JP | 2004161739 A | 6/2004 |
| JP | 4472002 B2 | 6/2010 |
| JP | 2010-252785 A | 11/2010 |
| JP | 2011-185839 A | 9/2011 |
| JP | 2012-501437 A | 1/2012 |
| JP | 2015-058394 A2 | 3/2015 |
| JP | 2015-512766 T | 4/2015 |
| KR | 10-1442486 B1 | 9/2014 |
| WO | WO 1996/29629 A2 | 9/1996 |
| WO | WO 1998/06667 A1 | 2/1998 |
| WO | WO 01/05731 A1 | 1/2001 |
| WO | WO 2001/89787 A2 | 11/2001 |
| WO | WO 2004/002627 A2 | 1/2004 |
| WO | WO 2004/048356 A1 | 6/2004 |
| WO | WO 2004/091763 A2 | 10/2004 |
| WO | WO 2005/021151 A1 | 3/2005 |
| WO | WO 2005/037267 A1 | 4/2005 |
| WO | WO 2007/128045 A1 | 11/2007 |
| WO | WO 2007/141002 A1 | 12/2007 |
| WO | WO 2008/000042 A1 | 1/2008 |
| WO | WO 2008/072155 A1 | 6/2008 |
| WO | WO 2009/077147 A2 | 6/2009 |
| WO | WO 2010/024753 A1 | 3/2010 |
| WO | WO 2010/121328 A1 | 10/2010 |
| WO | WP 2010/123453 A1 | 10/2010 |
| WO | WO 2012/027366 A2 | 3/2012 |
| WO | WO 2012/098140 A1 | 7/2012 |
| WO | WO 2012/135259 A1 | 10/2012 |
| WO | WO 2014/004630 A1 | 1/2014 |
| WO | WO 2014/022268 A1 | 2/2014 |
| WO | WO 2014/066624 A1 | 5/2014 |
| WO | WO 2014/142924 A1 | 9/2014 |

OTHER PUBLICATIONS

Partial European Search Report dated Jul. 11, 2017 for Application No. EP 11820522.8.
International Preliminary Report on Patentability dated Mar. 7, 2013 for Application No. PCT/US2011/048804.
International Search Report and Written Opinion dated Apr. 10, 2012 for Application No. PCT/US2011/048804.
International Preliminary Report on Patentability dated Jan. 8, 2015 for Application No. PCT/US2013/047829 mailed Jan. 8, 2015.

(56) References Cited

OTHER PUBLICATIONS

International Search Report and Written Opinion dated Sep. 9, 2013 for Application No. PCT/US2013/047829.
International Preliminary Report on Patentability for Application No. PCT/US2013/066591 dated May 7, 2015.
International Search Report and Written Opinion dated Mar. 11, 2014 for Application No. PCT/US2013/066591.
International Preliminary Report on Patentability for Application No. PCT/US2015/037662 dated Jan. 5, 2017.
International Search Report and Written Opinion for Application No. PCT/US2015/037662 dated Sep. 18, 2015.
Australian Examination Report for Application No. AU 2016311341 dated Jan. 22, 2020.
Chinese Office Action dated Nov. 15, 2019 for Application No. 201680059383.7.
Chinese Office Action dated Jul. 24, 2020 for Application No. 201680059383.7.
Chinese Office Action dated Mar. 3, 2021 for Application No. 201680059383.7.
Chinese Office Action dated Jul. 7, 2021 for Application No. CN 201680059383.7.
Partial European Search Report dated Feb. 1, 2019 for Application No. EP 16840074.5.
Extended European Search Report dated May 6, 2019 for Application No. EP 16840074.5.
European Office Action for Application No. 16840074.5 dated Feb. 18, 2020.
European Office Action dated Oct. 14, 2020 for Application No. EP 16840074.5.
Japanese Office Action for Application No. 2018-510770 dated Apr. 2, 2019.
Japanese Office Action for Application No. 2020-018064 dated Jan. 12, 2021.
Japanese Notice of Allowance dated Sep. 7, 2021 for Application No. JP 2020-018064.
International Search Report and Written Opinion for Application No. PCT/US2016/048513 dated Nov. 4, 2016.
International Preliminary Report on Patentability for Application No. PCT/US2016/048513 dated Mar. 8, 2018.
Abate et al., High-throughput injection with microfluidics using picoinjectors. Proc Natl Acad Sci U S A. Nov. 9, 2010; 107(45):19163-6. doi: 10.1073/pnas.1006888107. Epub Oct. 20, 2010.
Adams et al., High-throughput, temperature-controlled microchannel acoustophoresis device made with rapid prototyping. J Micromech and Microegineering. Jul. 2012. 10.1088/0960-1317/22/7/075017.
Angell et al., Silicon Micromechanical Devices. Scientific American. Apr. 1, 1983;248:44-55.
Augustsson et al., Microfluidic, label-free enrichment of prostate cancer cells in blood based on acoustophoresis. Anal Chem. 2012;84(18):7954-7962.
Behrens et al., Microscale anechoic architecture: acoustic diffusers for ultra low power microparticle separation via traveling surface acoustic waves. Lab Chip. Jan. 7, 2015;15(1):43-6.
Bourquin et al., Tuneable surface acoustic waves for fluid and particle manipulations on disposable chips. Lab Chip. Aug. 7, 2010;10(15):1898-901. doi: 10.1039/c004506c. Epub Jun. 10, 2010.
Chen et al., A micro fluidic manipulator for enrichment and alignment of moving cells and particles. J Biomech Eng. 2009;131(7):074505.
Chen et al., Particle enrichment employing grooved microfluidic channels. Applied Physics Letters. 2008;92:173502-1.
Chen et al., Particle manipulation inside a grooved microfluidic channel. Proceedings of the ASME 2009 MNHMT Interntational Conference. Shanghai, China. Dec. 18-21, 2009: 1-6.
Chen et al., Pulsed laser activated cell sorting with three dimensional sheathless inertial focusing. Small. 2014;10(9):1746-1751.
Choi et al., A cell rolling cytometer reveals the correlation between mesenchymal stem cell dynamic adhesion and differentiation state. Lab Chip. 2014;14(1):161-166.
Choi et al., Cell sorting by deterministic cell rolling. Lab Chip. 2012;12(8):1427-1430.
Choi et al., Continuous blood cell separation by hydrophoretic filtration. Lab Chip. Nov. 2007;7(11):1532-8. doi: 10.1039/b705203k. Epub Aug. 10, 2007.
Choi et al., Continuous hydrophoretic separation and sizing of microparticles using slanted obstacles in a microchannel. Lab Chip. 2007;7(7):890-897.
Choi et al., Hydrophoretic high-throughput selection of platelets in physiological shear-stress range. Lab Chip. Feb. 7, 2011;11(3):413-8. doi: 10.1039/c01c00148a. Epub Nov. 12, 2010.
Choi et al., Hydrophoretic sorting of micrometer and submicrometer particles using anisotropic microfluidic obstacles. Anal Chem. 2009;81(1):50-55.
Choi et al., Microfluidic self-sorting of mammalian cells to achieve cell cycle synchrony by hydrophoresis. Anal Chem. 2009;81(5):1964-1968.
Choi et al., Sheathless hydrophoretic particle focusing in a microchannel with exponentially increasing obstacle arrays. Anal Chem. 2008;80(8):3035-3039.
Choi et al., Tuneable hydrophoretic separation using elastic deformation of poly (dimethylsiloxane). Lab Chip. Jul. 7, 2009;9(13):1962-5. doi: 10.1039/b820364d. Epub Mar. 13, 2009.
Chung et al., Plastic microchip flow cytometer based on 2- and 3-dimensional hydrodynamic flow focusing. Microsystem Technologies. 2003;9:525-533.
Chung et al., Three dimensional, sheathless, and high-throughput microparticle inertial focusing through geometry-induced secondary flows. Small. 2013;9(5):685-690.
Collins et al., Particle separation using virtual deterministic lateral displacement (vDLD). Lab Chip. May 7, 2014;14(9):1595-603.
Collins et al., The particle valve: On-demand particle trapping, filtering, and release from a microfabricated poly dimethylsiloxane membrane using surface acoustic waves. Applied Physics Letters. Jul. 2014;105:33509.
Destgeer et al., Continuous separation of particles in a PDMS microfluidic channel via travelling surface acoustic waves (TSAW). Lab Chip. 2013;13(21):4210-4216.
Destgeer et al., Submicron separation of microspheres via travelling surface acoustic waves. Lab Chip. 2014;14(24):4665-4672.
Ding et al., Standing surface acoustic wave (SSAW) based multi-channel cell sorting. Lab Chip. 2012;12(21):4228-4231.
Duffy et al., Rapid Prototyping of Micro fluidic Systems in Poly(dimethylsiloxane). Anal Chem. Dec. 1, 1998;70(23):4974-84. doi: 10.1021/ac980656z.
Evander et al., Noninvasive acoustic cell trapping in a microfluidic perfusion system for online bioassays. Anal Chem. 2007;79(7):2984-2991.
Franke et al., Surface acoustic wave (SAW) directed droplet flow in microfluidics for PDMS devices. Lab Chip. Sep. 21, 2009;9(18):2625-7.
Franke et al., Surface acoustic wave actuated cell sorting (SAWACS). Lab Chip. Mar. 21, 2010;10(6):789-94.
Geislinger et al., Sorting of circulating tumor cells (MV3-melanoma) and red blood cells using non-inertial lift. Biomicrofluidics. 2013;7(4):44120.
Hawkes et al., Force field particle filter, combining ultrasound standing waves and laminar flow. Sensors and Actuators B. 2001;75:213-222.
Hoi et al., Microfluidic sorting system based on optical force switching. Applied Physics B. 2009;97:859-865.
Hoi et al., Microfluidic sorting system based on optical force switching. Proc of SPIE. 2010;7593:759313-1.
Howell et al., Two simple and rugged designs for creating microfluidic sheath flow. Lab Chip. 2008;8(7):1097-1103.
Hsu et al., Microvortex for focusing, guiding and sorting of particles. Lab Chip. 2008;8(12):2128-2134.
Ismagilov et al., Pressure-driven laminar flow in tangential microchannels: an elastomeric microfluidic switch. Anal Chem. 2001;73(19):4682-4687.
Jakobsson et al., Acoustic actuated fluorescence activated sorting of microparticles [published correction appears in Lab Chip. Dec. 21, 2015;15(24):4625]. Lab Chip. 2014;14(11):1943-1950.
Johnson et al., Rapid microfluidic mixing. Anal Chem. 2002;74(1):45-51.

(56) References Cited

OTHER PUBLICATIONS

Kapishnikov et al., Continuous particle size separation and size sorting using ultrasound in a microchannel. Journal od Statistical Mechanics: Theory and Experiment. 2006:1-15.
Kim et al., Sheathless microfluidic particle focusing technique using slanted microstructure array. Microfluidics and Nanofluidics. 2014; 16(1-2), 159-166.
Kumar et al., Fractionation of cell mixtures using acoustic and laminar flow fields. Biotechnol Bioeng. 2005;89(2):129-137.
Laurell et al., Chip integrated strategies for acoustic separation and manipulation of cells and particles. Chem Soc Rev. 2007;36(3):492-506.
Mao et al., Hydrodynamic sorting of microparticles by size in ridged microchannels. Physics of Fluids. 2011;23:051704-2-051704-4.
Masaeli et al., Continuous Intertial Focusing and Separation of Particles by Shape. Physical Review X. Sep. 12, 2012; 2(Mar. 10, 2017): 1-13. doi: https://doi.org/10.1103/PhysRevX.2.031017.
Munir et al., Experimental investigation of magnetically actuated separation using tangential microfluidic channels and magnetic nanoparticles. IET Nanobiotechnol. 2014;8(2):102-110.
Mutafopulos et al., Selective cell encapsulation, lysis, pico-injection and size-controlled droplet generation using traveling surface acoustic waves in a microfluidic device. Lab Chip. Nov. 7, 2020;20(21):3914-3921. doi: 10.1039/d01c00723d. Epub Sep. 23, 2020.
Narayanan et al., A microfabricated electrical SPLITT system. Lab Chip. Jan. 2006;6(1): 105-14. doi: 10.1039/b504936a. Epub Dec. 5, 2005.
Neild et al., A Micro-particle Positioning Technique Combining an Ultrasonic Manipulator and Microgripper. J. Micromech. Microeng. Aug. 2006;(16): 1562-1570. doi: 10.1088/0960-1317/16/8/017.
Orloff et al., Manipulating particle trajectories with phase-control in surface acoustic wave microfluidics. Biomicrofluidics. 2011;5(4):44107-441079.
Petersson et al., Free flow acoustophoresis: microfluidic-based mode of particle and cell separation. Anal Chem. 2007;79(14):5117-5123.
Ravula et al., A microfluidic system combining acoustic and dielectrophoretic particle preconcentration and focusing. Sensors and Actuators B: Chemical. 2008;130(2):645-52.
Schmid et al., Acoustic modulation of droplet size in a T-junction. Applied Physics Letters. Mar. 31, 2014;104(13):133501-4. DOI: 10.1063/1.4869536.
Schmid et al., Novel surface acoustic wave (SAW)-driven closed PDMS flow chamber. Microfluidics and Nanofluidics. Jan. 2012;12(1-4):229-35.
Schmid et al., SAW-controlled drop size for flow focusing. Lab Chip. May 7, 2013;13(9):1691-4. doi: 10.1039/c3lc41233d.
Sesen et al., Microfluidic plug steering using surface acoustic waves. Lab Chip. 2015;15(14):3030-3038.
Shi et al., Focusing microparticles in a microfluidic channel with standing surface acoustic waves (SSAW). Lab Chip. Feb. 2008;8(2):221-3.
Skowronek et al., Particle deflection in a poly(dimethylsiloxane) microchannel using a propagating surface acoustic wave: size and frequency dependence. Anal Chem. Oct. 15, 2013;85(20):9955-9. doi: 10.1021/ac402607p. Epub Sep. 20, 2013.
Song et al., Continuous medium exchange and cell isolation by size-selective passage through slanted micro-obstacles. Journal of Micromech, Microeng. Feb. 2014;24(2). 025007. doi: https://doi.org/10.1088/0960-1317/24/2/025007.
Song et al., Field-free, sheathless cell focusing in exponentially expanding hydrophoretic channels for microflow cytometry. Cytometry A. 2013;83(11):1034-1040.
Song et al., Inertial modulation of hydrophoretic cell sorting and focusing. Applied Physics Letters. Feb. 2014; 104(074106): 1-4 doi: https://doi.org/10.1063/1.4866045.
Tsutsui et al., Cell Separation by Non-Inertial Force Fields in Microfluidic Systems. Mech Res Commun. Jan. 1, 2009;36(1):92-103.
Wang et al., Numerical Investigation of Mixing in Microchannels With Patterned Grooves. J. Micromech. Mircoeng. Jul. 9, 2003;(13):801-808.
Witte et al., Microfluidic resonant cavities enable acoustophoresis on a disposable superstrate. Lab Chip. 2014;14(21):4277-4283.
Wood et al., Formation and manipulation of two-dimensional arrays of micron-scale particles in microfluidic systems by surface acoustic waves. Applied Physics Letters. 2009;94(5):054101.
Yan et al., On-chip high-throughput manipulation of particles in a dielectrophoresis-active hydrophoretic focuser. Sci Rep. 2014;4:5060.
Yantchev et al., A micromachined Stoneley acoustic wave system for continuous flow particle manipulation in microfluidic channels. Journal of Micromechanics and Microengineering. 2010;20:1-5.
Chinese Office Action dated Nov. 10, 2021 for Application No. CN 201680059383.7.
Chinese Notice of Allowance dated Jan. 29, 2022 for Application No. CN 201680059383.7.
Ding et al., Cell separation using tilted-angle standing surface acoustic waves. Proc Natl Acad Sci U S A. Sep. 9, 2014;111(36):12992-7. doi: 10.1073/pnas.1413325111. Epub Aug. 25, 2014.
Schmid et al., Sorting drops and cells with acoustics: acoustic microfluidic fluorescence-activated cell sorter. Lab Chip. Oct. 7, 2014;14(19):3710-8. doi: 10.1039/c4lc00588k.
Ung et al., Enhanced surface acoustic wave cell sorting by 3D microfluidic-chip design. Lab Chip. Oct. 3, 2017;17(23): 4059-4069. doi: 10.1039/C7LC00715A.
Yan et al., A hybrid dielectrophoretic and hydrophoretic microchip for particle sorting using integrated prefocusing and sorting steps. Electrophoresis. Jan. 2015;36(2): 284-291. doi:0.1002/elps.201400397.

* cited by examiner

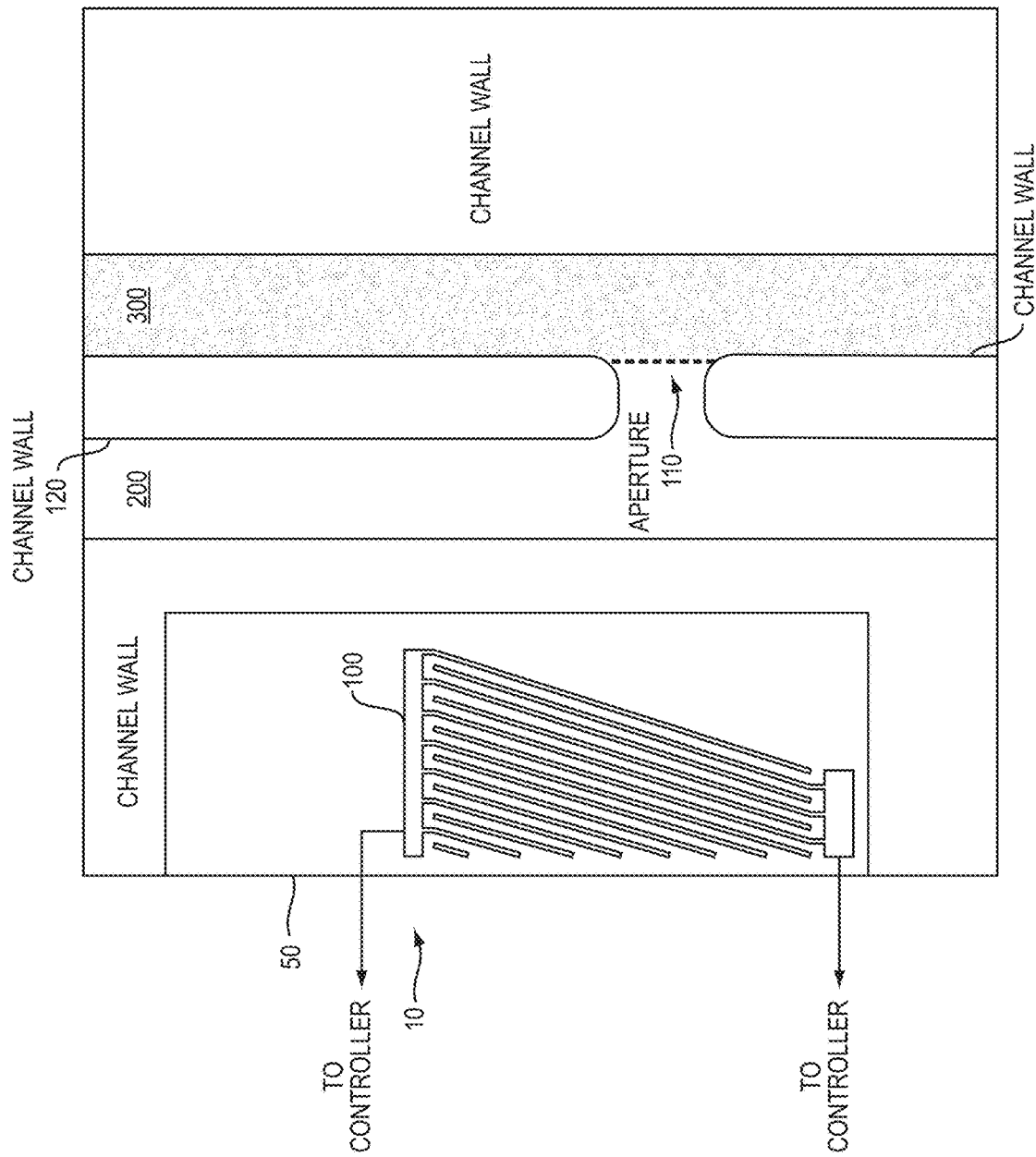

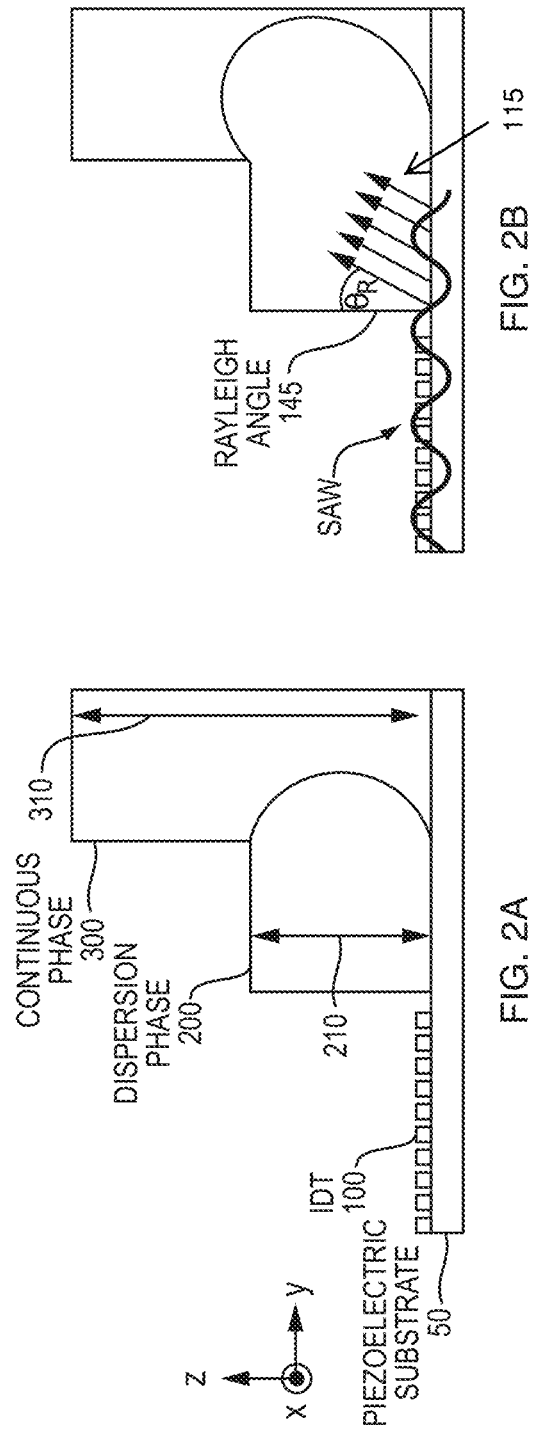
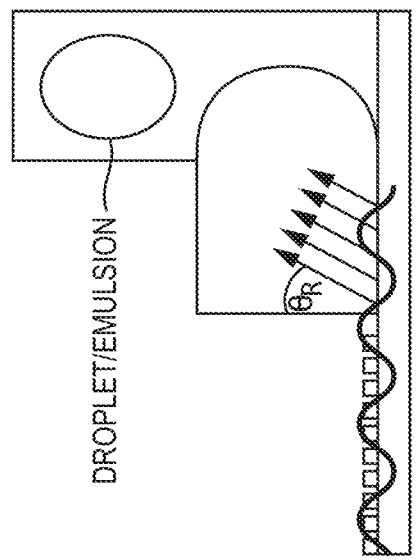

SYSTEMS AND METHODS FOR MICROFLUIDIC PARTICLE SELECTION, ENCAPSULATION, AND INJECTION USING SURFACE ACOUSTIC WAVES

CROSS-REFERENCE TO RELATED APPLICATIONS

This application claims the benefit of priority to U.S. Provisional Patent Application No. 62/885,000, filed Aug. 9, 2019, the entire contents of this application being incorporated herein by reference.

BACKGROUND

Systems and methods to separate specific particles from a heterogeneous particle population can operate on the detect/decide/deflect principle. In a microfluidic system, particles can be detected using, e.g., optical means as they flow in a microchannel. Characteristic properties of the particle can be identified based upon the detection methodology, and the decision can be made to select and separate the particle from the general population. The particle can then be deflected from the flow of particles and diverted, for example, to a specified storage area such as a predetermined branch of a microfluidic channel network.

SUMMARY

In some embodiments disclosed herein, a microfluidic system is taught. The microfluidic system includes a substrate. A dispersion phase fluidic channel is formed in the substrate. A continuous phase fluidic channel is formed in the substrate and is in fluid communication with the dispersion phase fluidic channel through an aperture in a channel wall therebetween. An interdigital transducer (IDT) is in contact with the substrate and is configured to generate a surface acoustic wave to inject fluid from the dispersion phase fluidic channel into the continuous phase fluidic channel through the aperture.

In some embodiments disclosed herein, a method of sorting a particle population is taught. The method includes flowing a stream of particles in a dispersion phase fluidic channel that is formed in a substrate. The method also includes detecting a particle of interest in the stream of particles. The method also includes actuating an interdigital transducer in contact with the substrate to generate a surface acoustic wave and inject a volume of fluid including the particle of interest from the dispersion phase fluidic channel into a continuous phase fluidic channel through an aperture. and the interdigital transducer is configured to generate a surface acoustic wave.

BRIEF DESCRIPTION OF THE DRAWINGS

The skilled artisan will understand that the drawings are primarily for illustrative purposes and are not intended to limit the scope of the subject matter taught herein. The drawings are not necessarily to scale; in some instances, various aspects of the subject matter disclosed herein may be exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIG. 1 illustrates a top view of an exemplary microfluidic system for droplet production in a microfluidic system in accordance with various embodiments taught herein.

FIGS. 2A-2C illustrate cross-sectional image end views of a droplet formation sequence in the system of FIG. 1.

DETAILED DESCRIPTION OF THE DRAWINGS

Figure 2D:
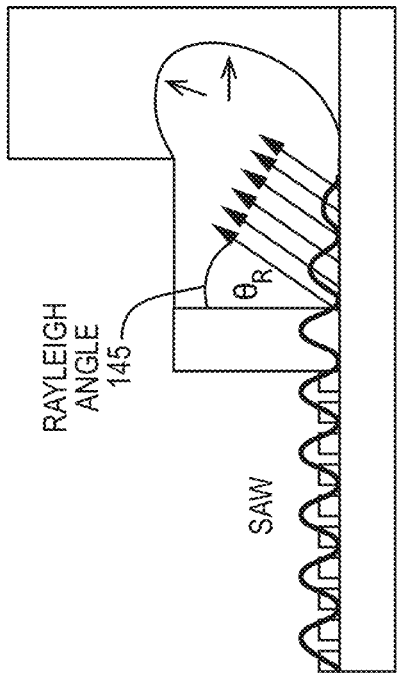
FIG. 2D-2F illustrates cross-sectional image views of a droplet formation sequence in the system of FIG. 1 with a channel height overlay.

The present application relates to acoustic microfluidic systems and methods that can generate emulsions/droplets or encapsulate particles of interest (including mammalian cells, bacteria cells, or other cells) into droplets upon detection of the particles of interest flowing in a stream of particles. The systems operate on the detect/decide/deflect principle. In accordance with embodiments taught herein, the deflection step, in a single operation, can deflect one or more particles of interest from a stream of particles and encapsulate the one or more particles of interest in an emulsion droplet.

In addition to particle encapsulation, the systems and methods taught herein can simultaneously release (e.g., lyse a cell) and encapsulate DNA, RNA, and proteins from cells without chemicals or additional processing. Systems and methods taught herein have an abrupt transition in the channel geometry from a shorter channel to a taller channel (i.e., in the shape of a 'step') to break the stream of the dispersed phase into a droplet upon acoustic actuation. When there is no acoustic wave present, no droplets/emulsions are generated and the stream of particles proceeds uninterrupted. The rapid actuation and post-actuation recovery employed by systems and methods taught herein can ensure that some or all of the selected particles are deflected, and that few or no empty droplets are produced. Practicing embodiments taught herein results in a high throughput of particles. In some embodiments, the systems and methods taught herein can ensure that each produced droplet contains just one cell, particle, organic molecule, or reagent per droplet thereby overcoming Poisson statistics. In some embodiments, the systems and methods can also introduce/inject materials and samples into droplets.

As used herein, the term "particle" includes, but is not limited to, cells (e.g., blood platelets, white blood cells, tumor cells, embryonic cells, or spermatozoa), organelles, and multi-cellular organisms. Particles may include liposomes, proteoliposomes, yeast, bacteria, viruses, pollens, algae, or the like. Additionally, particles may include genetic material, biomolecules, RNA, DNA, proteins, or fragments thereof. Particles may also refer to non-biological particles. For example, particles may include metals, minerals, polymeric substances, glasses, ceramics, composites, or the like. Particles may also refer to synthetic beads (e.g., polystyrene), for example, beads provided with fluorochrome conjugated antibodies.

FIG. 1 illustrates an exemplary substrate in a microfluidic system 10 for droplet production. The system 10 includes a dispersion phase fluidic channel 200 and a continuous phase fluidic channel 300 formed in the substrate. The dispersion phase fluidic channel 300 and the continuous phase fluidic channel 300 are separated by a channel wall 120. An aperture 110 in the channel wall 120 enables fluid communication, exchange, or transfer between the dispersion phase fluidic channel 200 and the continuous phase fluidic channel 300. The system 10 includes an interdigital (or interdigitated) transducer (IDT) 100 in contact with a piezoelectric substrate 50. The IDT 100 is configured to generate a surface acoustic wave to inject fluid from the dispersion phase fluidic channel into the continuous phase fluidic channel through the aperture. The system 10 can deflect or divert selected particles flowing in the dispersion phase fluidic channel 200 to the continuous phase fluidic channel 300 while avoiding disruption to the flow of unselected particles in the dispersion phase fluidic channel 200.

A fluid flows in the dispersion phase fluidic channel 200 carrying particles past the IDT 100. The continuous phase fluidic channel 300 is separated from the dispersion phase fluidic channel 200 by the channel wall 120. The continuous phase fluidic channel 300 and the dispersion phase fluidic channel 200 are in fluid communication through the aperture 110 in the channel wall 120.

Activation of the IDT, for example, by a controller causes a momentary pulse of pressure 115 (shown in FIG. 2B) in a direction perpendicular to the direction of fluid flow in the dispersion phase fluidic channel 200. The momentary pulse of pressure 115 can divert a volume of fluid from the dispersion phase fluidic channel 200 through the aperture 110 and into the continuous phase fluidic channel 300. The diverted volume of fluid, or droplet, can include zero or more particles. The diverted volume of fluid that is injected into the continuous phase fluidic channel 300 can form a droplet having a diameter in a range from 20 micrometers to 70 micrometers in various embodiments. In some embodiments, the fluid in the continuous phase fluidic channel 300 may be more hydrophobic or more nonpolar than the fluid in the dispersion phase fluidic channel 200. In some embodiments, the fluid in the continuous phase fluidic channel 300 may have a different viscosity than the fluid in the dispersion phase fluidic channel 200. In an exemplary embodiment, the fluid in the dispersion phase fluidic channel 200 is aqueous and the fluid in the continuous phase fluidic channel 300 is an oil. In some embodiments, the fluid in one of the channels can be a gas. For example, the IDT can inject a volume of gas into a fluid stream in some embodiments.

In certain embodiments, the system 10 diverts the particle of interest into a separate microchannel (i.e., the continuous phase fluidic channel separated 300 by the channel wall 120 from the initial dispersion phase fluidic channel 200) at the point where the pressure pulse is applied by the IDT 100. In other words, activation of the IDT 100 can separate particles into different flow channels at the position of the IDT 100 along the flow channel and not downstream of the IDT 100. Separation of particles of interest at the point of application of the pressure pulse (e.g., rather than downstream) can help reduce or avoid fluidic disturbance to the flow downstream in the dispersion phase fluidic channel 200.

In some embodiments, the particles of interest 100 are encapsulated in an emulsion droplet by operation of the IDT 100. Encapsulation of certain particles, e.g., cells, in an immiscible droplet can provide a buffer surrounding the particle that can protect viability or structural integrity of the particle during subsequent processing.

In accordance with various embodiments, a height 210 of the continuous phase fluidic channel 300 is greater than a height 310 of the dispersion phase fluidic channel 200. The difference in heights may be designated in accordance with a selected channel height ratio in some embodiments. By differentiating the heights of the two channels, the surface acoustic wave from the IDT 100 can generate emulsions that pass from one channel to the other. In other words, the channel height 210 of the dispersion phase fluidic channel 200 is less than the channel height 310 of the continuous phase fluidic channel 310 (as shown in FIGS. 2A-2F) in some embodiments. The dashed line indicates the aperture 110 in the channel wall 120 for the emulsions to form. In some embodiments, the height of the dispersion phase fluidic channel 200 is in a range from 15 micrometers to 300 micrometers. In some embodiments, the height of the continuous phase fluidic channel 300 is in a range from 20 micrometers to 500 micrometers.

The difference in height between the channels can be expressed in some embodiments as a channel height ratio. In some embodiments, the channel height ratio between the dispersion phase fluidic channel 200 and the continuous phase fluidic channel 300 can be in a range from 30:60 to 30:90.

In various embodiments, the IDT 100 can be operatively coupled to a controller that controls operation of, and provides power to, the IDT 100. The controller is described in greater detail below in relation to FIG. 16 and can include a power supply and control modules implemented in software or hardware. In exemplary embodiments, the controller provides signals in a power range from 36-42 dBm to the IDT 100 to output a pulse. In some embodiments, the controller can provide pulsed signals to the IDT. A length of each pulse provided by the controller can be in a range from 25-100 µs in some embodiments.

The IDT 100 is coupled to the substrate 50 to deliver a standing acoustic wave into the dispersion phase fluidic channel 200. The substrate 50 can be formed at least in part of a material that is piezoelectric, that is, a material in which the application of electrical charge induces mechanical deformation. The piezoelectric material may have a relatively high modulus of elasticity. The piezoelectric substrate 50 can include one or more layers including lithium niobate (LiNbO$_3$), lithium tantalite, lead zirconium titanate (LZT), zinc oxide (ZnO), aluminum nitride, a polymer such as polyvinylidene fluoride (PVdF) or other fluropolymer, quartz, or other material. In some embodiments, the substrate 50 is formed of a material having good acoustic transmission characteristics including, by way of non-limiting examples, silicon, polymers, or glass. Examples of IDTs and substrates compatible with the systems and method taught herein are described in U.S. Pat. No. 10,646,870 to Koksal et al., the entire contents of this patent being incorporated herein by reference.

In some embodiments, the IDT 100 may be configured to generate a traveling or streaming surface acoustic wave (TSAW) or pressure pulse in the fluid in one or both channels 200, 300. The TSAW can be used to drive a volume of fluid from the dispersion-phase fluidic channel 200 to the continuous-phase fluidic channel 300. In some embodiments, a second IDT can be provided opposite the first IDT 100 and adjacent to the continuous phase fluidic channel 300 at a same location along the channels as the first IDT 100 or at a different location along the channels. Alternatively, the second IDT can be provided on a same side of the channels 200, 300 as the first IDT. The first and second IDTs may independently generate TSAWs to apply pressure pulses to the fluid in one or both channels.

According to other embodiments, a geometry or a surface or both of the fluidic channels 200, 300 may be configured to reflect the acoustic wave in the channels 200, 300 so as to create a standing interference pattern or a standing surface acoustic wave (SSAW). In some embodiments, a second IDT can be provided opposite the first IDT 100 and adjacent to the continuous phase fluidic channel 300 at a same location along the channels as the first IDT 100 or at a different location along the channels. The first and second IDTs may generate opposing surface acoustic waves that merge to create a standing interference pattern within one or both of the channels. The SSAW acoustic wave signature may be used to focus particles within one or both channels.

FIGS. 2A-2C illustrates a sequence of cross-sectional end view images of the system of FIG. 1 during droplet/emulsion generation by a surface acoustic wave. As shown FIG. 2A, fluid flow in the dispersion phase fluidic channel 200 and the continuous phase fluidic channel 300 is balanced so as not to produce any droplets when the IDT 100 is not actuated. In FIG. 2B, the IDT 100 is actuated. Actuation of the IDT 100 produces a surface acoustic wave (SAW). The wave is initially generated in air and then refracts at the Rayleigh angle 145 upon interaction with fluid as indicated by the arrows. The acoustic waves force the dispersion phase into the continuous phase. As shown in FIG. 2C, the combination of acoustic waves and an abrupt change in channel geometry force the dispersion phase fluid to break into a droplet.

Figure 2E:
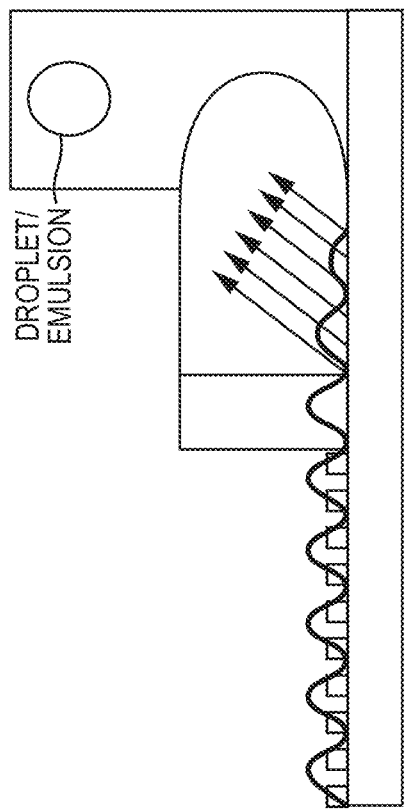
Figure 2F:
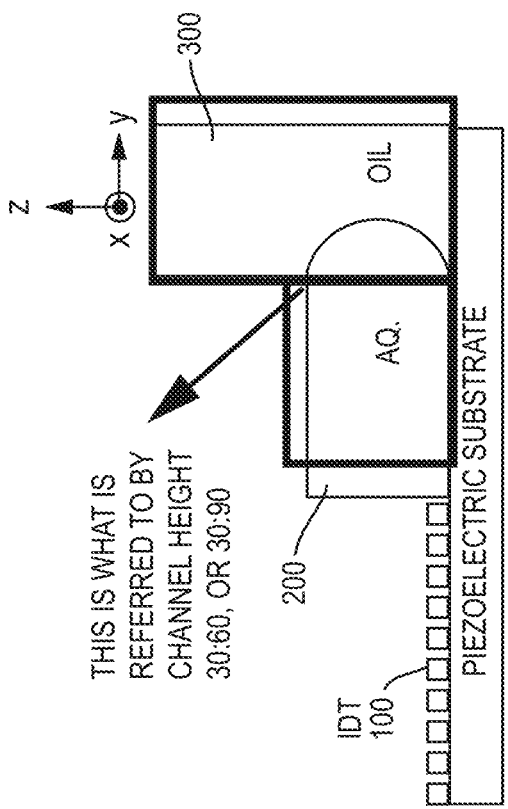

FIGS. 2D-2F depict a similar sequence as that shown in FIGS. 2A-2C while also illustrating channel height using a channel height overlay.

Figure 3:
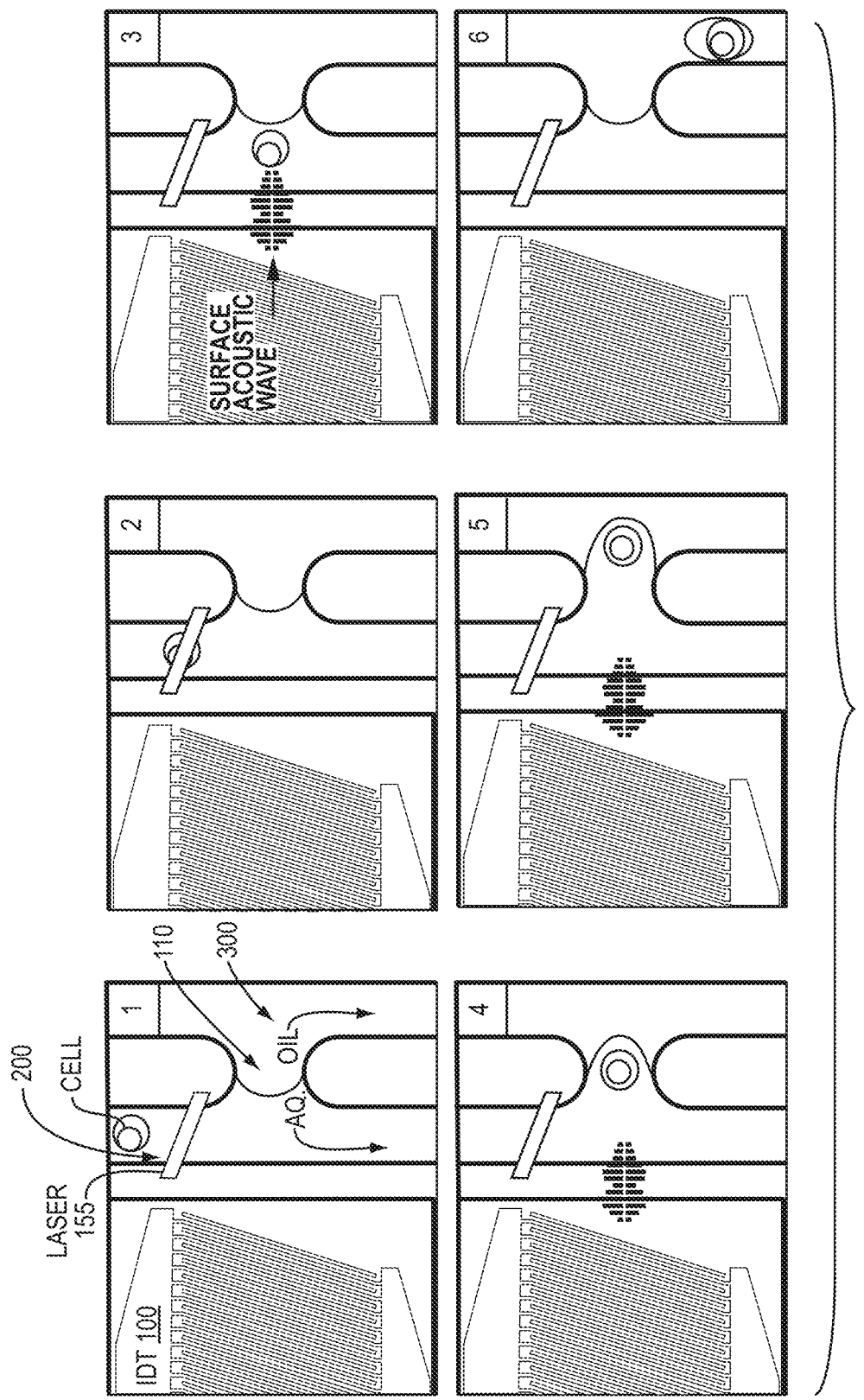
FIG. 3 schematically depicts a sequence showing selective (or sorting-based) encapsulation of a particle according to embodiments taught herein.

FIG. 3 schematically depicts a sequence showing selective (or sorting based) encapsulation. In frame 1, a fluorescent particle (for example, a cell) flows through the dispersion phase fluidic channel 200. In frame 2, the cell is detected by an optical system. For example, an electromagnetic radiation source 155, such as a laser, can interrogate the cell and a detector can receive light that has interacted with the particle (e.g., emitted or scattered from the particle) to determine one or more particle characteristics. In frame 3, the IDT is actuated by a controller upon detection of the cell by the optical system to generate a surface acoustic wave that propagates into the dispersion phase fluidic channel 200. Frames 4 and 5 illustrate emulsion formation as the surface acoustic wave simultaneously deflects the particle and generates an emulsion into the continuous phase. As shown in frame 6, the result is a particle selectively encapsulated in an emulsion. Actuation of the IDT 100 has also shifted the position of the particle from the dispersion phase fluidic channel 200 to the continuous phase fluidic channel 300.

Figure 4:
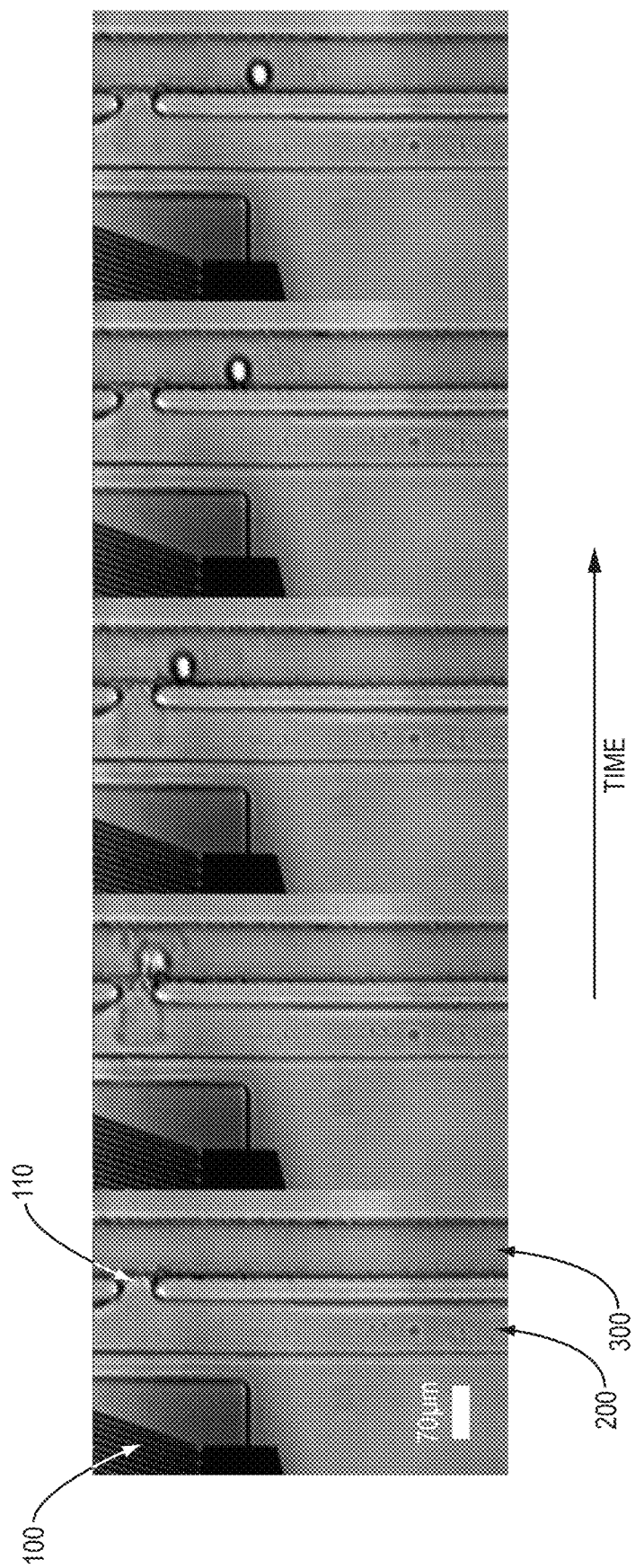
FIG. 4 illustrates a time-series of microscope images showing generation of emulsion droplets in accordance with embodiments taught herein.

FIG. 4 illustrates a series of frames over time showing emulsion generation/formation by surface acoustic wave in embodiments of a device according to the present disclosure. A pulsed acoustic wave is generated/propagated into the channel to create an emulsion. As taught herein, the IDT 100 generated the acoustic wave in response to instructions provided by signals from controller 160.

Figure 5:
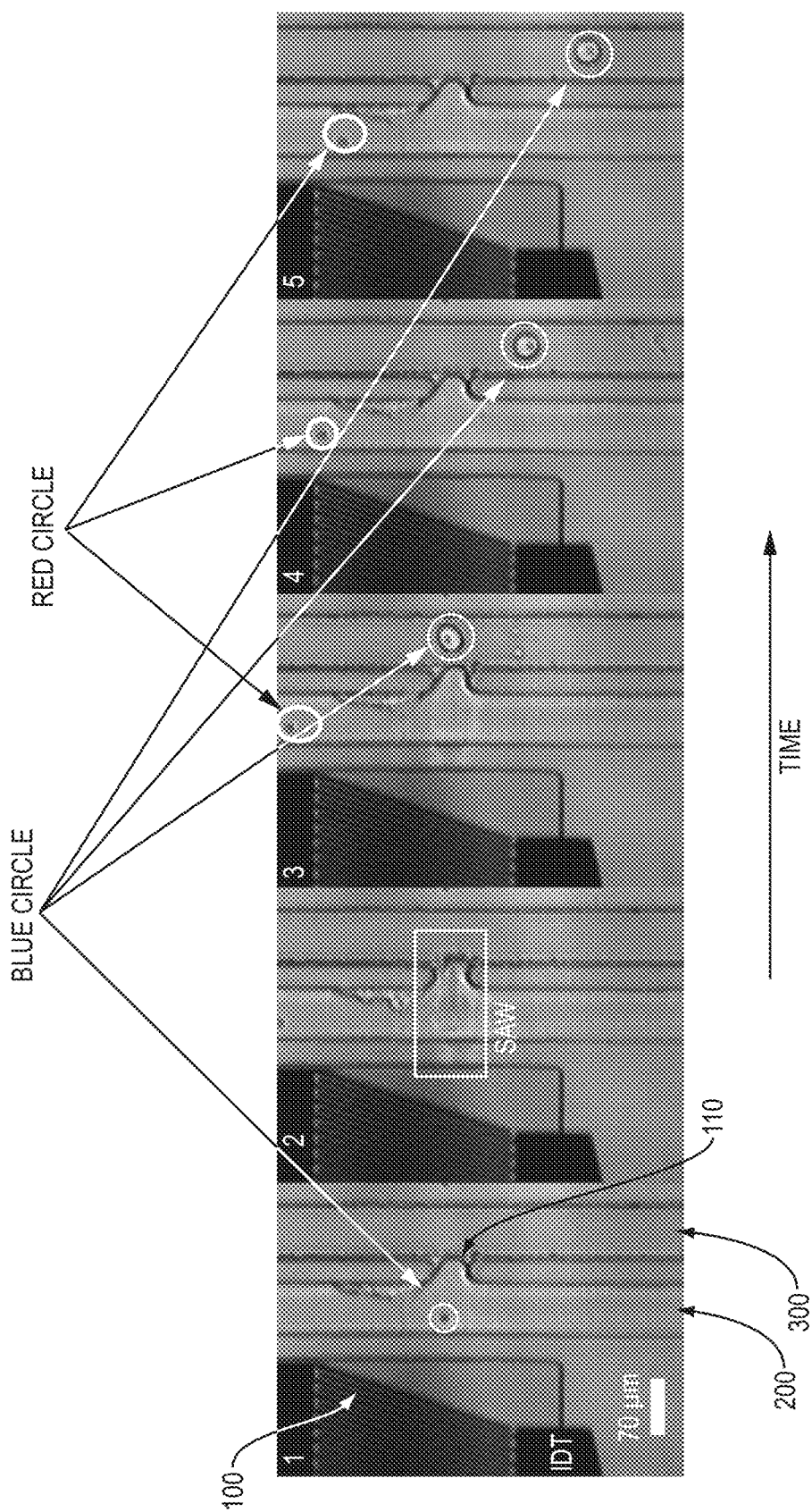
FIG. 5 illustrates a time-series of microscope images showing selective encapsulation and deflection of detected particles using embodiments taught herein.

FIG. 5 illustrates selective encapsulation and deflection of a particle using embodiments of the microfluidic device of the present disclosure. To create this series of images, a 50 µs pulse was used at 37 dBm to deflect and encapsulate the particle. In frame 1, a fluorescent particle (blue circle) flows through the dispersion phase fluidic channel 200 and is optically detected. In frame 2, a surface acoustic wave is generated by the IDT 100. In frame 3, the fluorescent particle is encapsulated in an emulsion and a non-fluorescent particle (red circle) begins to enter the sorting and encapsulation region (from the top of the image). In frames 4 and 5, the encapsulated fluorescent particle flows out of the device in the continuous phase fluidic channel 300.

Figure 6:
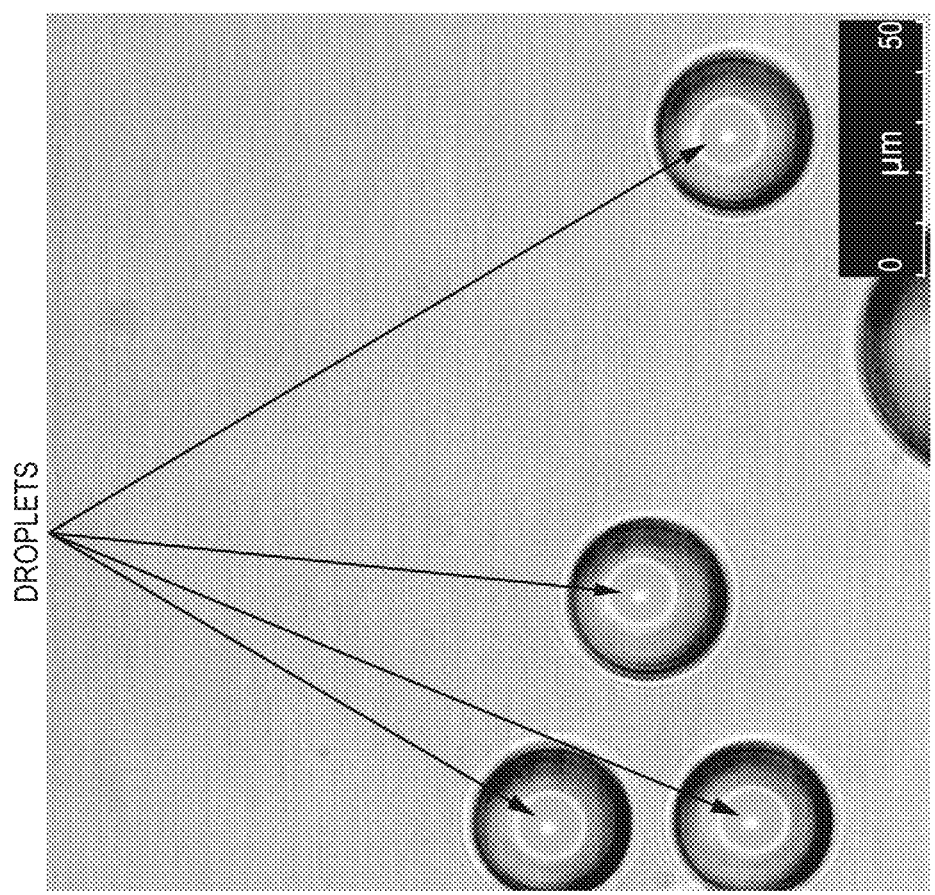
FIG. 6 illustrates a microscope image of selected fluorescent particles encapsulated in emulsion droplets according to embodiments as illustrated in FIG. 5.

FIG. 6 illustrates a microscope image of fluorescent particles successfully encapsulated in droplets/emulsions by surface acoustic waves by the process shown in FIG. 5.

Figure 7:
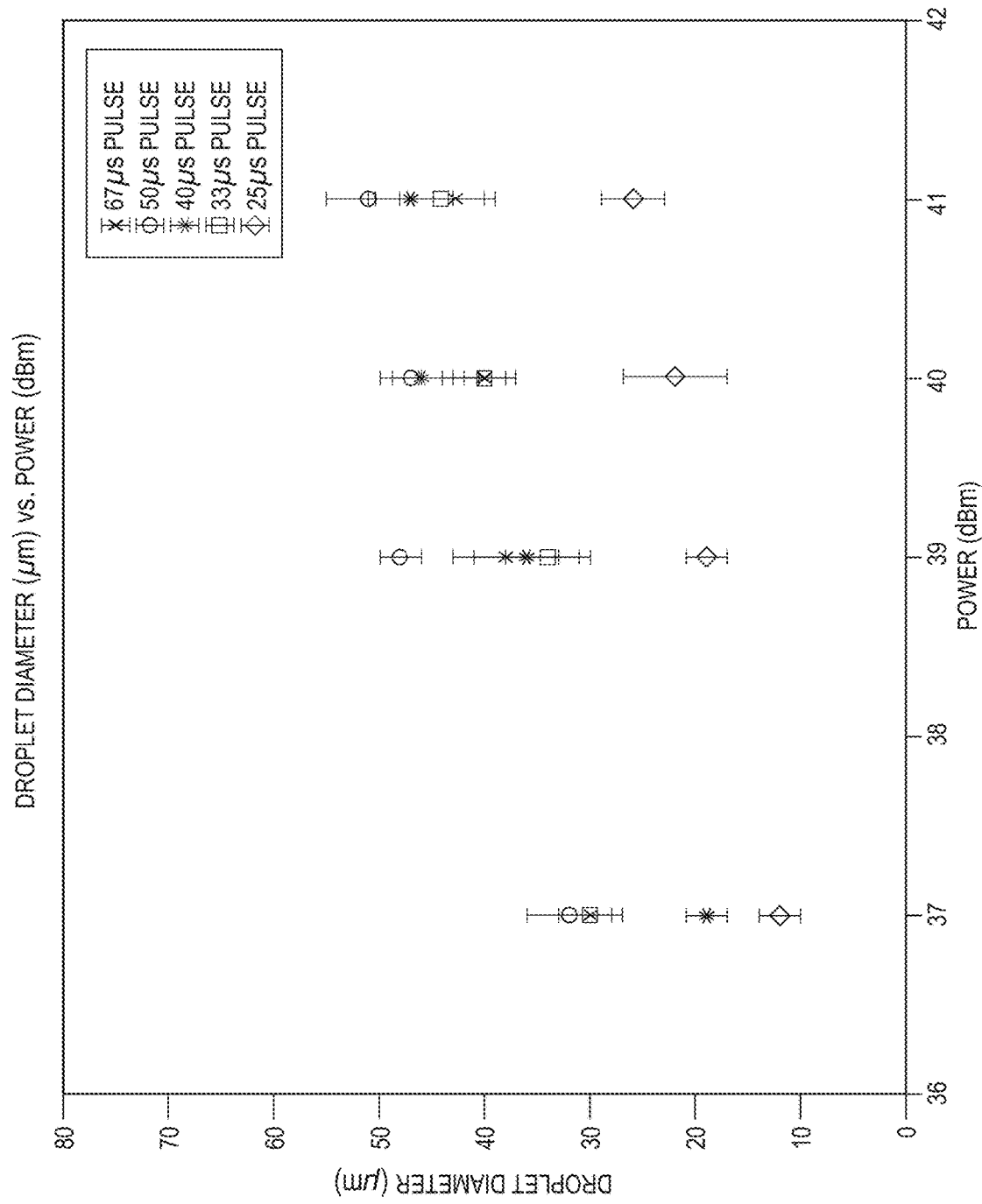
FIG. 7 is a chart illustrating emulsion droplet size as a function of power applied to an interdigital transducer (IDT) for different pulse lengths in accordance with embodiments taught herein.

FIG. 7 is a data chart illustrating droplet size as a function of power applied to the IDT 100. Five different pulse lengths were tested for each of the power settings. This data was generated using a 50 µm aperture 110 between the dispersion phase fluidic channel 200 and the continuous phase fluidic channel 300. In the device used to produce the data for FIG. 7, channel heights of the dispersion phase fluidic channel 200 and the continuous phase fluidic channel 300 were 30 µm and 60 µm, respectively. 1×PBS was the fluid present in the dispersion phase fluidic channel 200 and hydrofluoroether (HFE-7500) with 2% (w/w) surfactant was the fluid present in the continuous phase fluidic channel 300. As shown in the chart, increased power leads to increased diameter of the resulting droplet. Similarly, increased pulse length also trends towards increased diameter although there may be a saturation effect at large pulse lengths.

Figure 8:
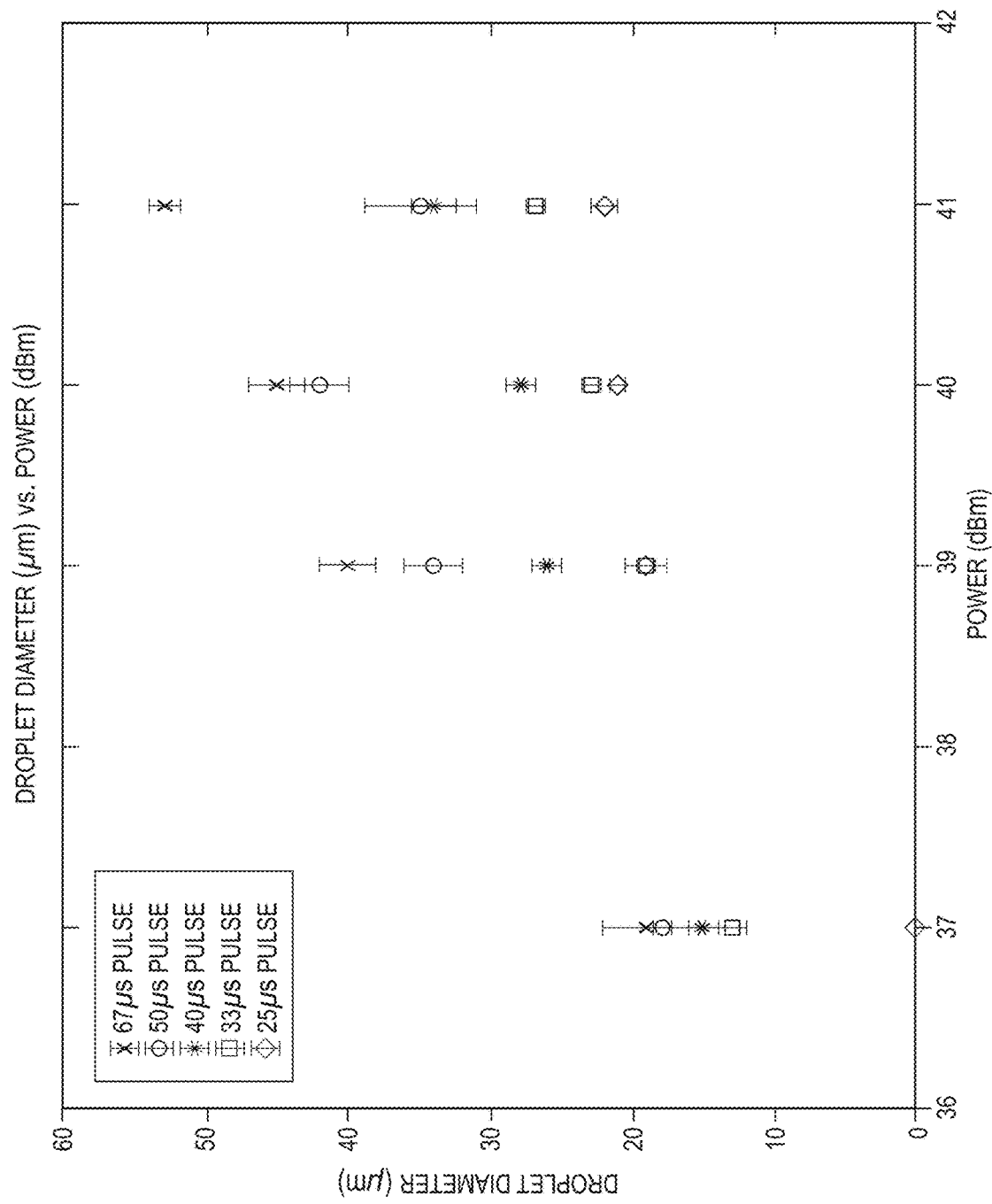
FIG. 8 is a chart illustrating droplet size as a function of power applied to the IDT for different fluids for different pulse lengths in accordance with embodiments taught herein.

FIG. 8 is a chart illustrating droplet size as a function of power applied to the IDT 100 for the same physical layout as described in relation to FIG. 7 but with a different continuous phase fluid. In particular, 1x PBS was the fluid present in the dispersion phase fluidic channel 200 as before but hydrofluoroether (HFE-7500) without 2% surfactant was the fluid present in the continuous phase fluidic channel 300. As with FIG. 7, five different pulse lengths were tested for each of the power settings, a 50 µm aperture was used, and the channel heights of the dispersion phase fluidic channel 200 and the continuous phase fluidic channel 300 were 30 µm and 60 µm, respectively. The use of a fluid without surfactant enables successful production of smaller diameter droplets and greater ability to tune droplet size by adjusting length of pulse (e.g., a power of 39 dBm can produce droplets from 18 to 45 microns in diameter by tuning the length of pulse).

Figure 9:
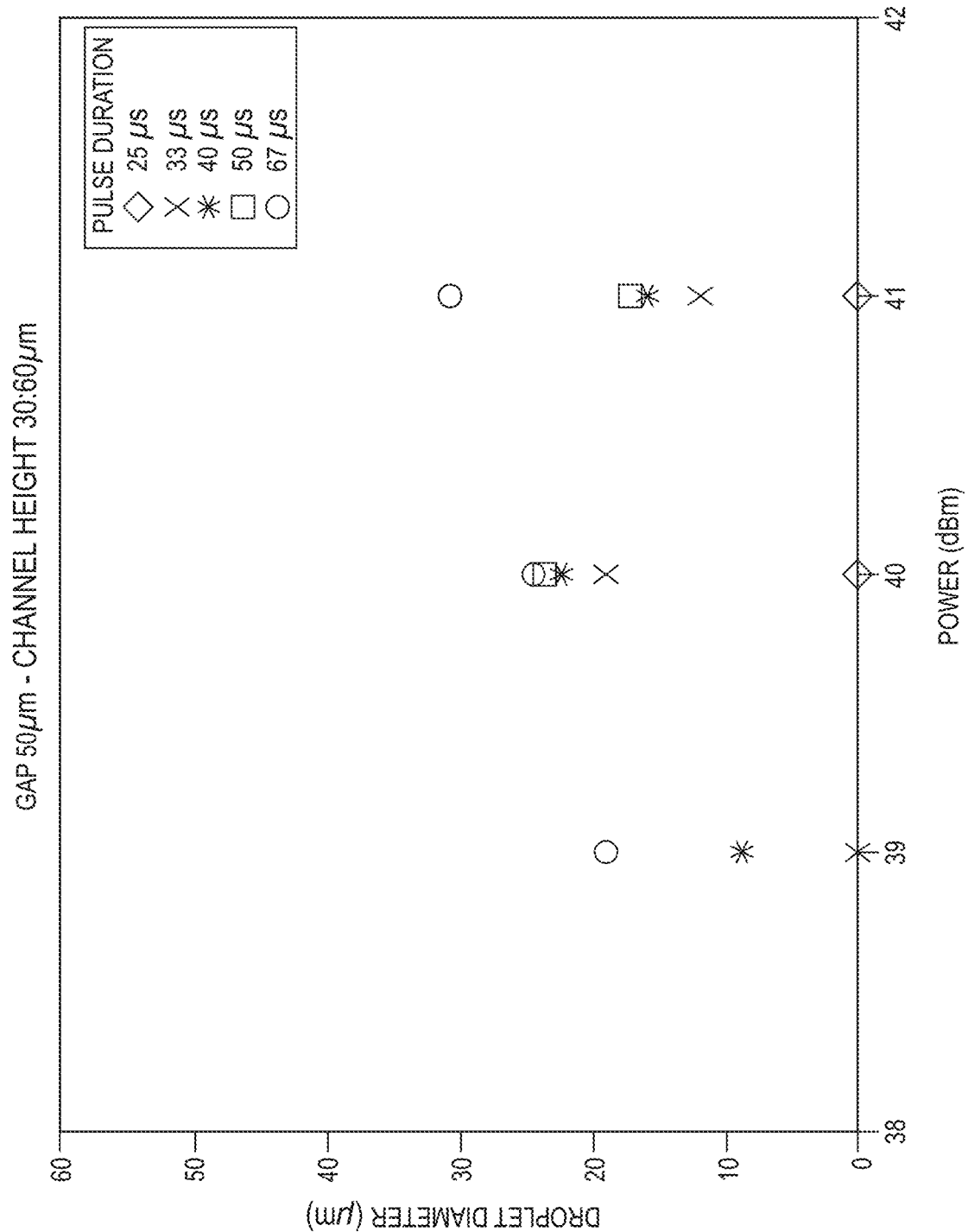
FIG. 9 is a chart illustrating droplet size as functions of power applied to the IDT and pulse length for a 50 micrometer aperture and channel height ratio of 30:60 in accordance with embodiments taught herein.

FIG. 9 is a chart illustrating droplet size as a function of power applied to the IDT. Five different pulse lengths were tested for each of the power settings, a 50 µm aperture was used, and the channel heights of the dispersion phase fluidic channel 200 and the continuous phase fluidic channel 300 were 30 µm and 60 µm, respectively.

Figure 10:
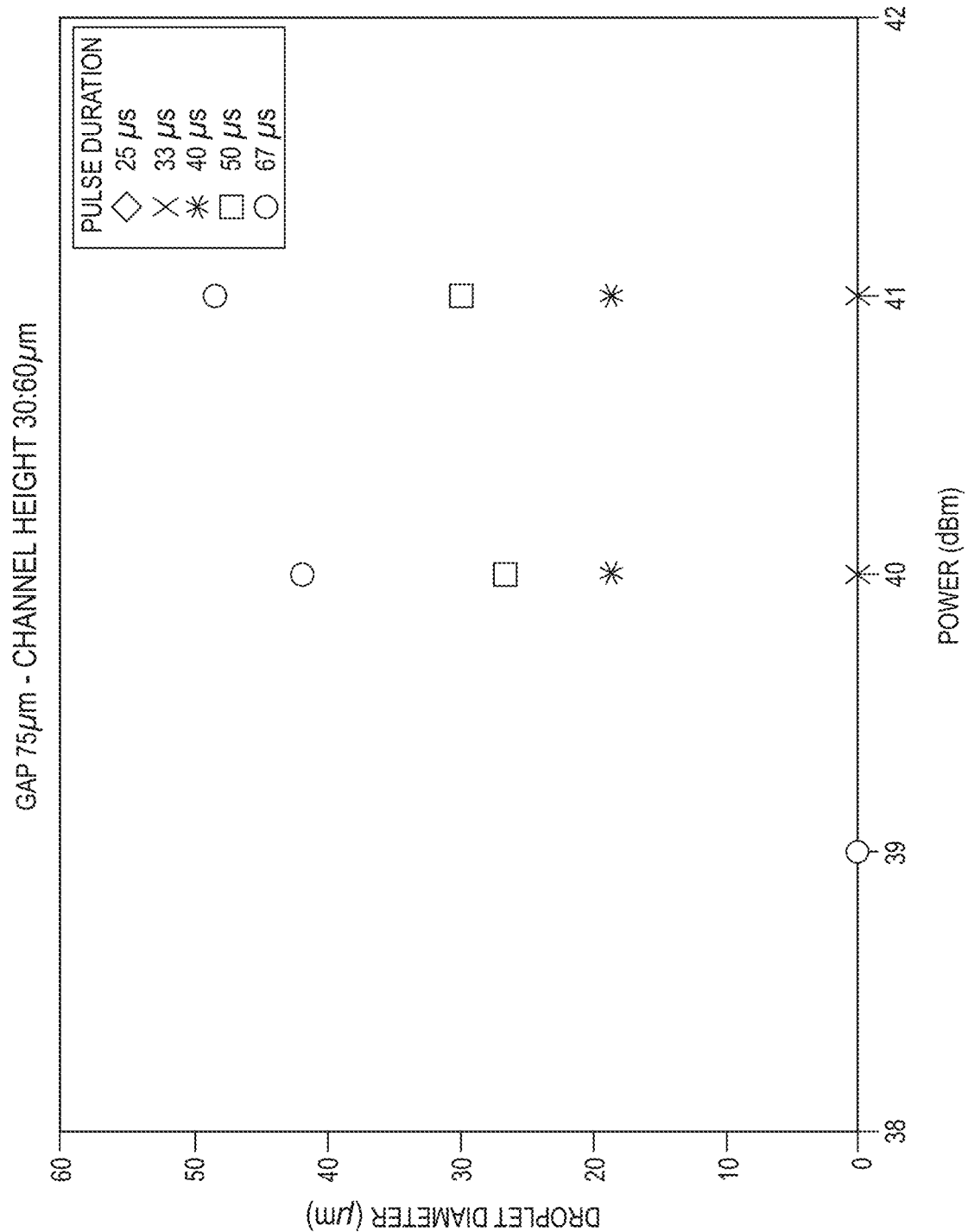
FIG. 10 is a chart illustrating droplet size as functions of power applied to the IDT and pulse length for a 75 micrometer aperture and channel height ratio of 30:60 in accordance with embodiments taught herein.

FIG. 10 is a chart illustrating droplet size as a function of power applied to the IDT. Five different pulse lengths were tested for each of the power settings, a 75 µm aperture was used, and the channel heights of the dispersion phase fluidic channel 200 and the continuous phase fluidic channel 300 were 30 µm and 60 µm, respectively. As shown in the chart, the larger aperture size (75 micrometers vs 50 micrometers) can enable larger diameter droplets.

Figure 11:
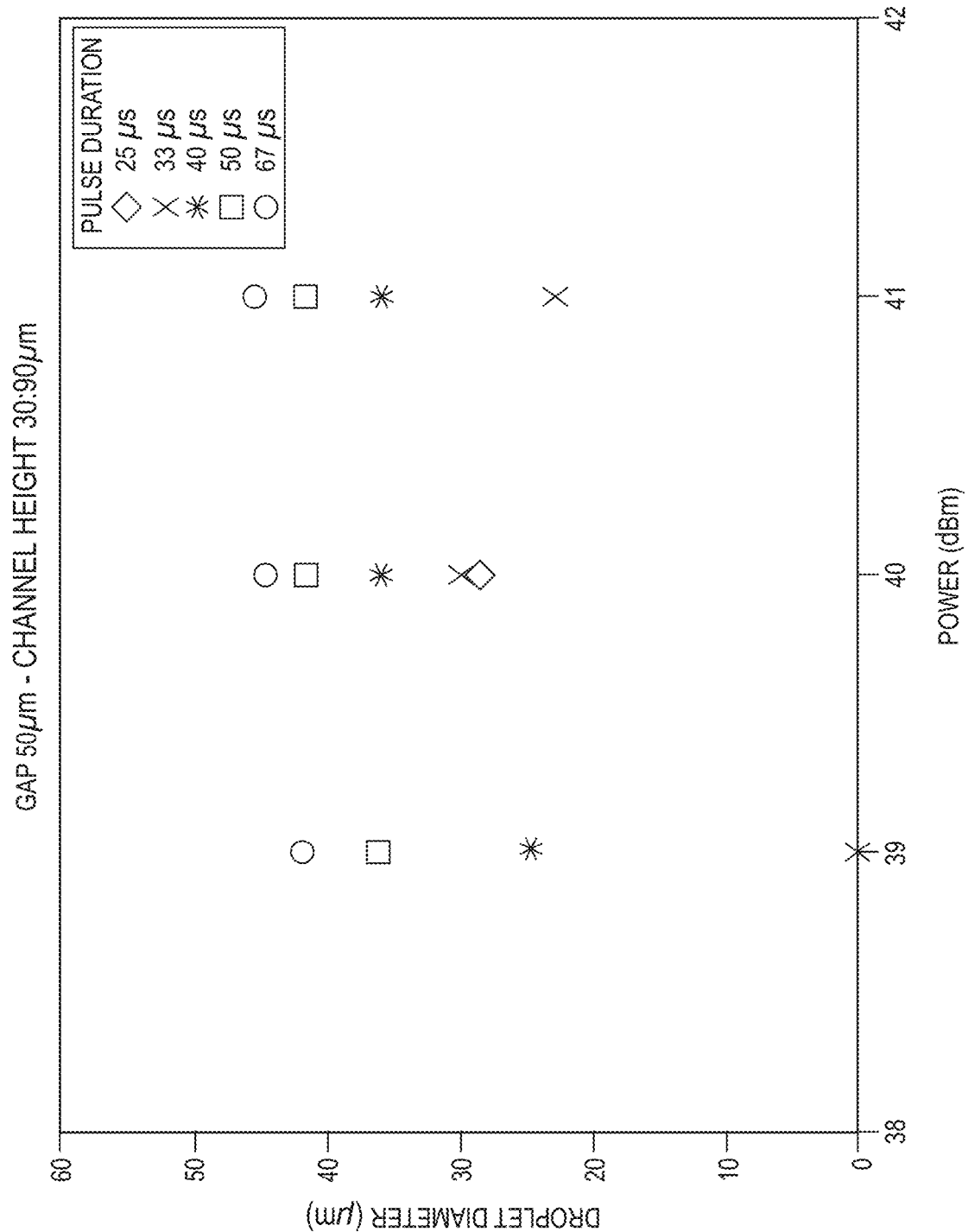
FIG. 11 is a chart illustrating droplet size as functions of power applied to the IDT and pulse length for a 50 micrometer aperture and channel height ratio of 30:90 in accordance with embodiments taught herein.

FIG. 11 is a chart illustrating droplet size as a function of power applied to the IDT. Five different pulse lengths were tested for each of the power settings, a 50 µm aperture was used, and the channel heights of the dispersion phase fluidic channel 200 and the continuous phase fluidic channel 300 were 30 µm and 90 µm, respectively. A larger channel height ratio enables larger droplet diameters and can also enable formation of larger droplets using shorter pulse lengths. In some embodiments, a shorter pulse length could be advantageous to enable greater selection and sorting throughput.

In accordance with various embodiments taught herein, systems and devices can advantageously perform a mechanical operation on a particle and encapsulate the particle in a single step. In an exemplary embodiment, systems and methods can lyse a cell by rupturing the cell membrane, thus providing access to the internal contents of the cell. In the same step, a volume of fluid including these internal contents can be encapsulated and diverted for further study, analysis, or use. In other embodiments, the mechanical operation can include killing the particle (such as a cell), disabling or deactivating a portion of the particle, or mixing components within the particle.

Figure 12:
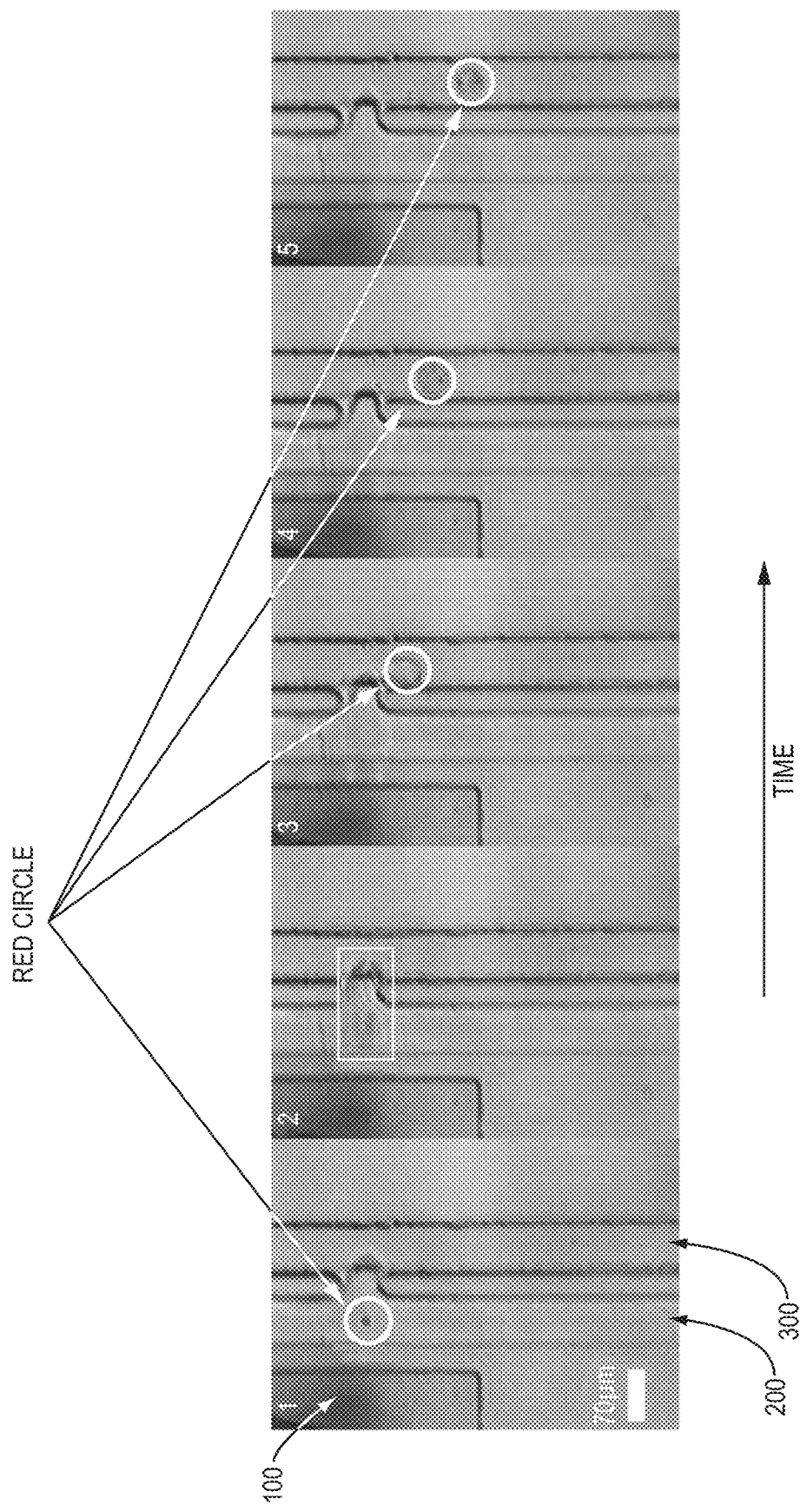
FIG. 12 illustrates lysis and encapsulation of a cell using a microfluidic device according to embodiments taught herein.

FIG. 12 illustrates lysis and encapsulation of a cell using the device according to embodiments of the present disclosure. Here, a K562 cell was lysed and encapsulated into an emulsion using a surface acoustic wave. In frame 1, a fluorescently labeled K562 cell (red circle) flows through the encapsulation region of the dispersion phase fluidic channel 200. In frame 2, the IDT 100 is actuated and a surface acoustic wave (yellow box) enters the dispersion phase fluidic channel 200. The surface acoustic wave lyses the K562 cell while simultaneously pushing the cell and fluid around the cell into the continuous phase fluid channel 300. In frame 3, a droplet/emulsion is generated containing the lysed cell (red circle). In frames 4 and 5, the droplet/emulsion containing the lysed cell flows out of the device in the continuous phase fluidic channel 300.

Figure 13B:
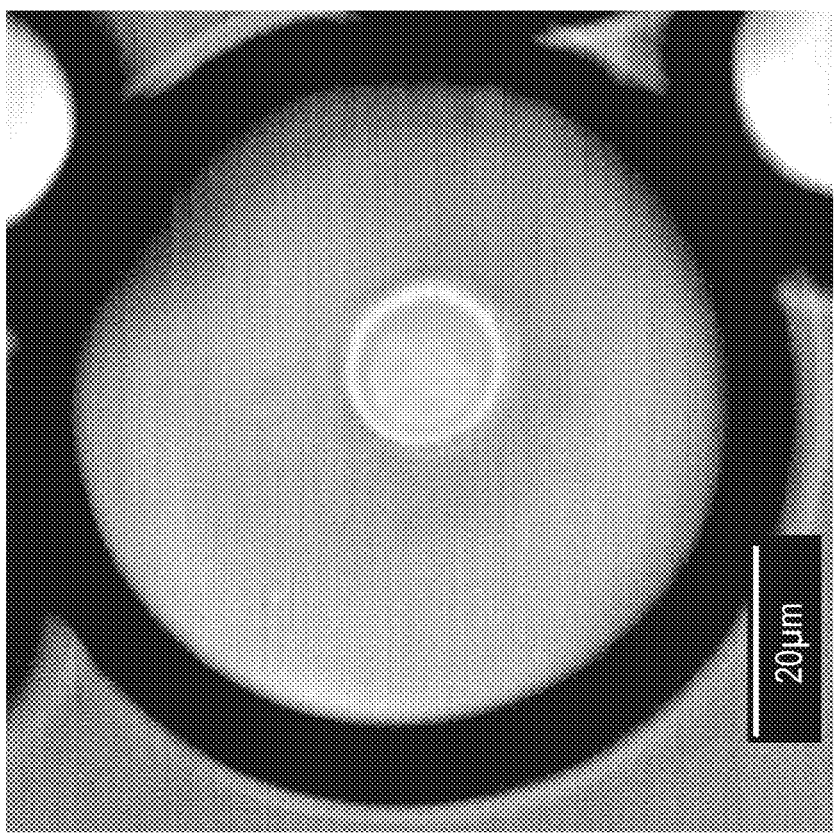
FIG. 13B illustrates a non-lysed cell in a droplet.
Figure 13A:
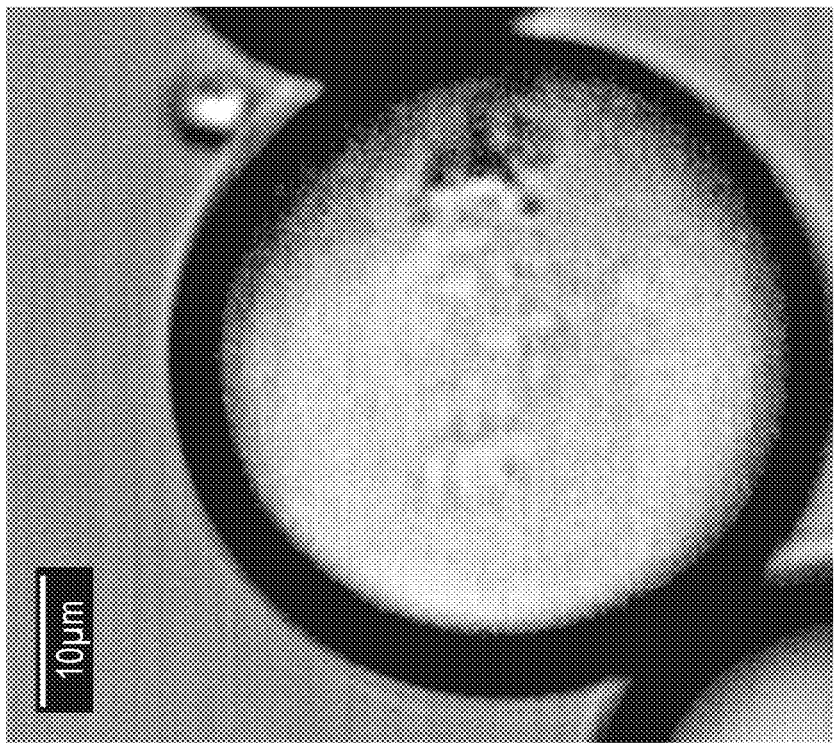
FIG. 13A is a microscope image of a lysed K562 cell in a droplet produced by the sequence illustrated above in FIG. 12.

FIG. 13A is a microscope image of a lysed K562 cell in a droplet produced by the sequence illustrated above in FIG. 9. The labeled cell components are distributed throughout the volume inside the droplet. For comparison, FIG. 13B is a microscope image of a non-lysed K562 cell in a droplet. The labeled cell components remain within the cell membrane of the cell, which is itself encapsulated by the droplet.

Figure 14:
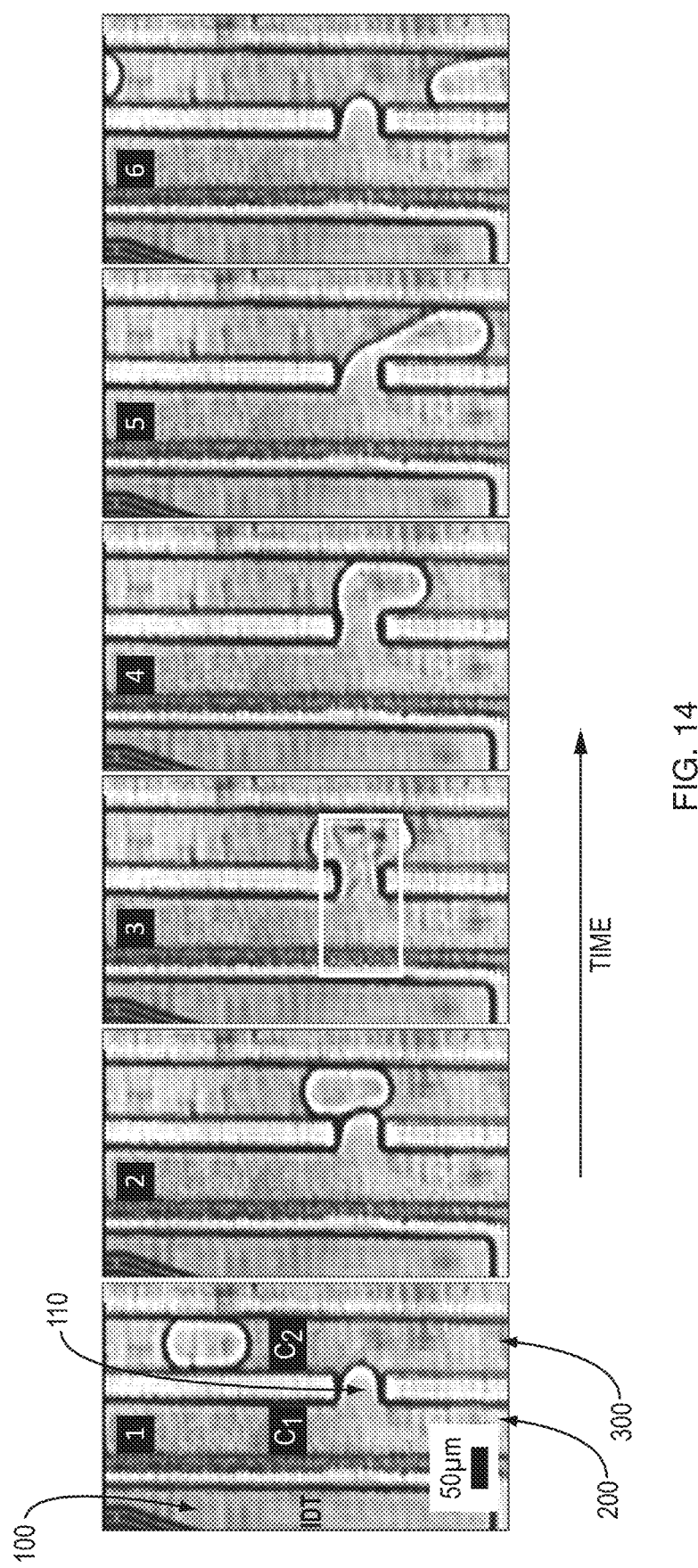
FIG. 14 illustrates a process of injection of fluid into a droplet/emulsion over a series of frames in accordance with embodiments taught herein.

FIG. 14 illustrates a process of injection of fluid into a pre-existing droplet over a series of frames. In the figure, C1 labels the dispersion phase fluidic channel 200 including fluorescent dye and C2 labels the continuous phase fluidic channel 300 including oil. In this configuration, water-in-oil drops flow through the continuous phase fluidic channel. In frames 1 and 2, droplets flow past the aperture 110 between the channels 200, 300 through which the fluid in the dispersion phase fluidic channel 200 is in contact with droplets/emulsions for injection in the continuous phase fluidic channel 300. The droplet traveling in the continuous phase fluidic channel can be detected using, for example, an optical detection system as described above in relation to FIG. 3.

In frame 3 of FIG. 14, the IDT 100 is actuated to generate a surface acoustic wave to inject fluid (in this example, fluorescent dye) from the dispersion phase fluidic channel 200 into a droplet/emulsion traveling through the continuous phase fluidic channel 300. In frames 4 and 5, the IDT 100 is turned off and the droplet continues to flow past the channel aperture 110. In frame 6, the next droplet enters (from the top of the image) and the previous droplet including injected fluorescent dye exits the device. In embodiments where the system is used for injection of material into pre-existing droplets, the height 310 of the continuous phase fluidic channel 300 can be about equal to the height 210 of the dispersion phase fluidic channel 200 (i.e., the channel height ratio can be 1:1). In other words, a 'step' (channel height difference) is not required in all embodiments when injecting into a pre-existing droplet.

Figure 15:
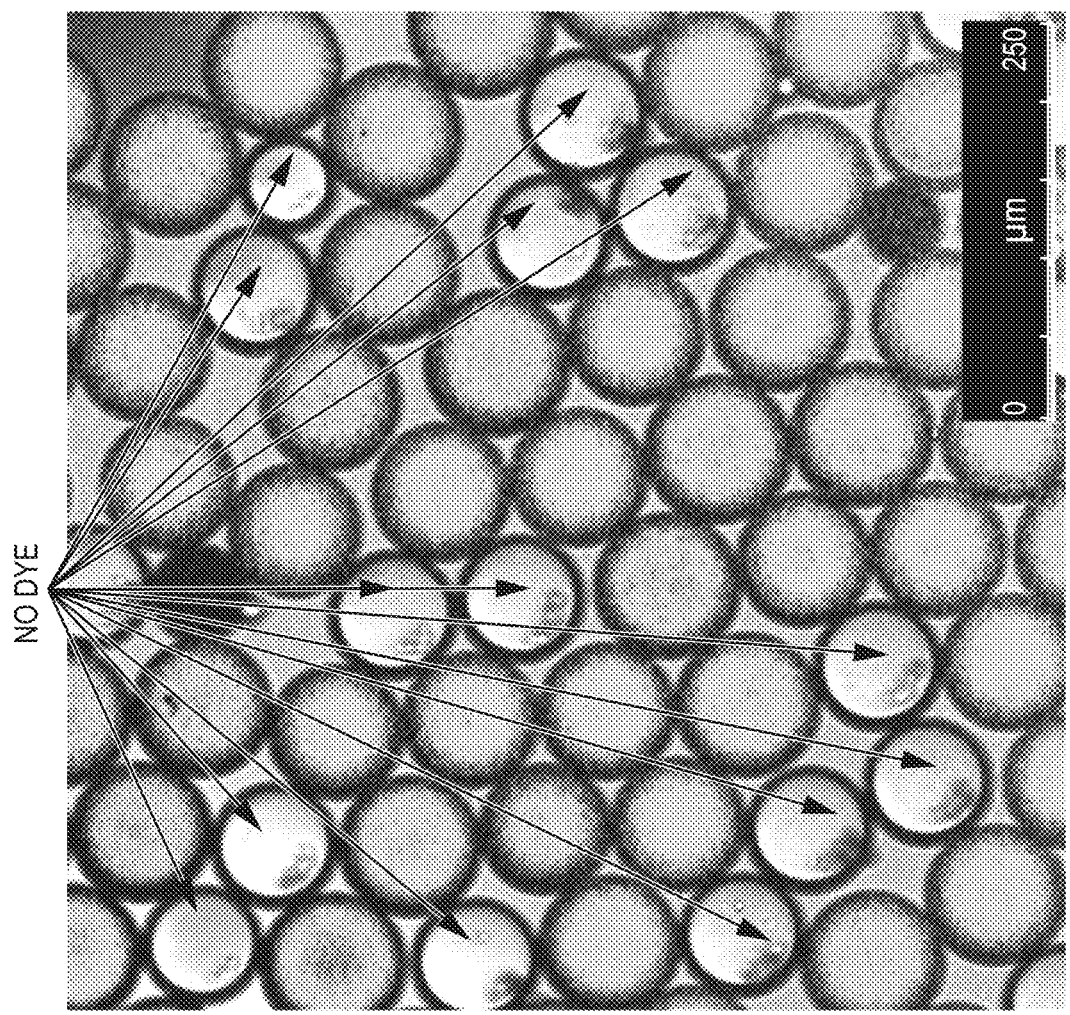
FIG. 15 is a microscope image showing droplets injected with dye by the process shown in FIG. 14 and droplets that were not injected with dye.

FIG. 15 is a microscope image showing droplets that were injected with fluorescent dye (green) and droplets that were not injected with dye (white/clear) after the droplets flowed through the device as described above with relation to FIG. 14.

Figure 16:
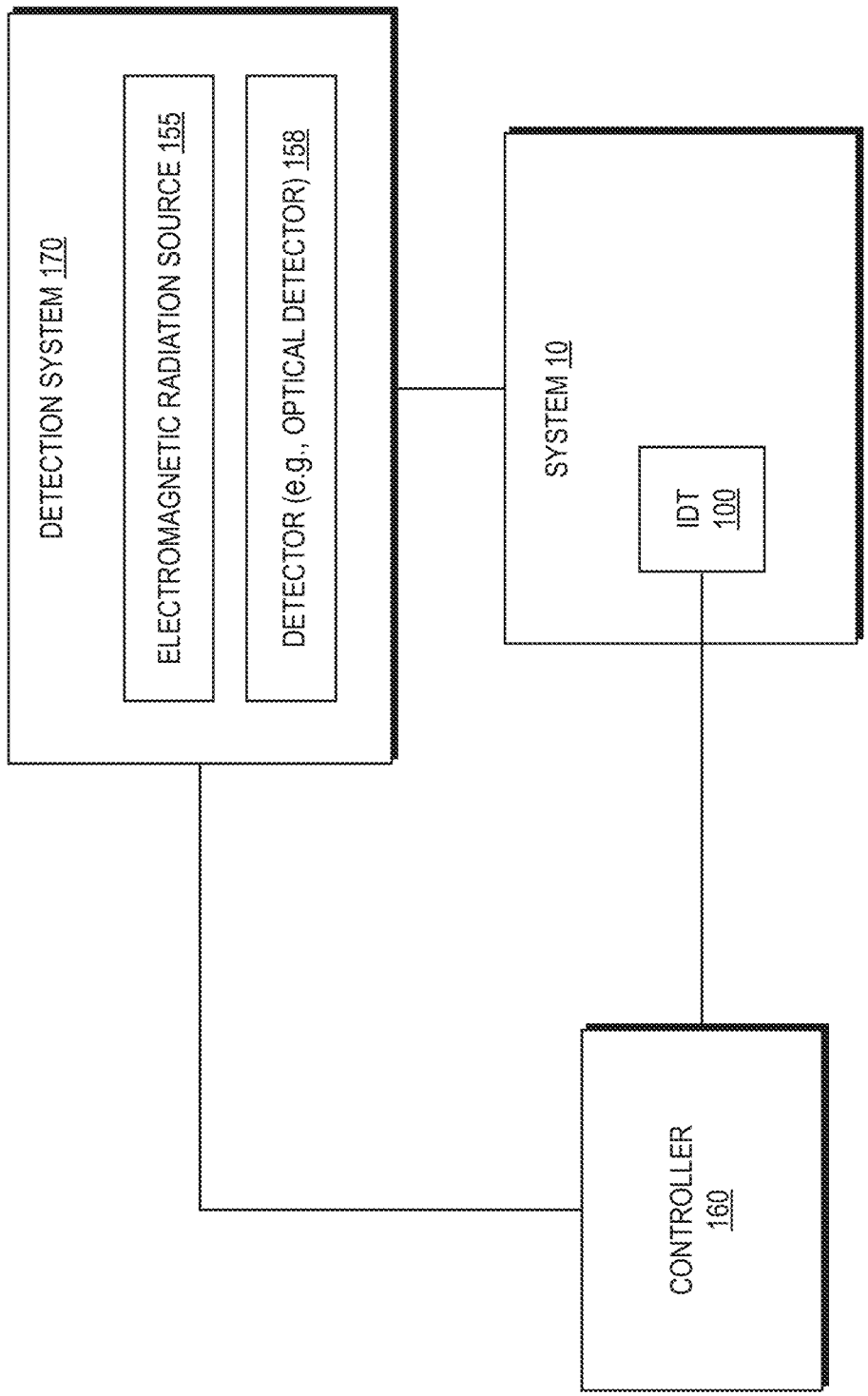
FIG. 16 illustrates the microfluidic system operatively coupled to a detection system and controller in accordance with various embodiments taught herein.

FIG. 16 illustrates the microfluidic system 10 connected to a controller 160 and detection system 170. The detection system 170 can include an electromagnetic radiation source 155 (such as a laser or other lamp source) and a detector 158. The controller 160 is in operative communication with the detection system 170 and the IDT 100.

In some embodiments, the controller 160 can send signals to the detection system 170 to control the electromagnetic radiation source 155 to illuminate one or more positions along the dispersion phase fluidic channel 200 or the continuous phase fluidic channel 300. The illuminating light can interact with a particle flowing the channel to produce an output light signal. The output light signal can be formed using one or more of absorption, scattering, fluorescence, refraction, or extinction interactions between the illuminating light and the particle. The detection system 170 can receive the output light signal using the detector 158, for example, an optical detector. The detector 158 can include one or more photomultiplier tubes, an array of detectors, one or more charge-coupled devices (CCDs), or any other suitable light detection device. The detection system 170 can send a signal to the controller corresponding to the The controller 160 can be implemented as a hardware-only system, a software-only system, or a hybrid hardware and software system. The controller 160 can supply power signals, control signals, or both to the IDT 100 to initiate and control surface acoustic wave production. In some embodiments, the controller 160 can include a computing device having a processor and a memory that can execute instructions. The controller 160 can include a power supply to supply pulsed or continuous power to the IDT 100. The controller 160 can include a pulse generator that defines pulse parameters for a power pulse including amplitude, pulse duration (length), and pulse rise and fall times.

Figure 17:
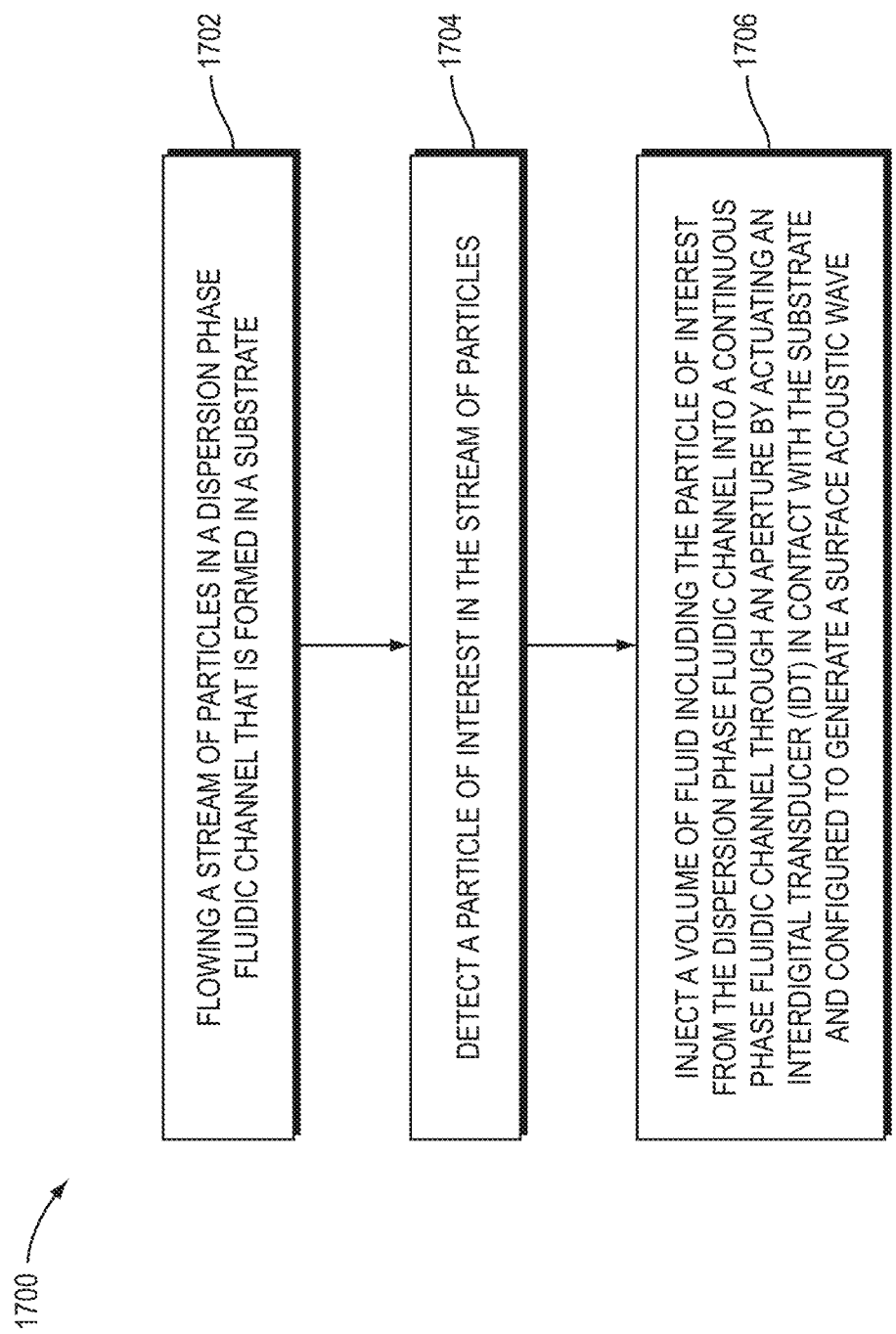
FIG. 17 illustrates a flowchart for sorting particles in accordance with various embodiments taught herein.

FIG. 17 illustrates a flowchart for a method 1700 of sorting particles in accordance with various embodiments taught herein. The method 1700 includes flowing a stream of particles in a dispersion phase fluidic channel 200 that is formed in a substrate 50 (step 1702). The method includes detecting a particle of interest in the stream of particles (step 1704). The method includes injecting a volume of fluid including the particle of interest from the dispersion phase fluidic channel 200 into a continuous phase fluidic channel 300 through an aperture 110 by actuating an interdigital transducer (IDT) 100 in contact with the substrate 50 and configured to generate a surface acoustic wave (step 1706).

As will be apparent to those of skill in the art upon reading this disclosure, each of the embodiments taught and illustrated herein has discrete components and features which may be readily separated from or combined with the features of any of the other several embodiments without departing from the scope or spirit of the present disclosure. Any recited method can be carried out in the order of events recited or in any other order that is logically possible.

What is claimed is:

1. A microfluidic system, comprising:
    a substrate;
    a dispersion phase fluidic channel formed in the substrate;
    a continuous phase fluidic channel formed in the substrate and in fluid communication with the dispersion phase fluidic channel through an aperture in a channel wall therebetween;
    an interdigital transducer (IDT) in contact with the substrate and configured to generate a surface acoustic wave to inject fluid from the dispersion phase fluidic channel into the continuous phase fluidic channel through the aperture,
    wherein a channel height of the dispersion phase fluidic channel is less than a channel height of the continuous phase fluidic channel, and
    wherein actuation of the IDT encapsulates and shifts a location of a particle from the dispersion phase fluidic channel to the continuous phase fluidic channel.

2. The microfluidic system of claim 1, wherein a ratio of the channel height of the dispersion phase fluidic channel to the channel height of the continuous phase fluidic channel is in a range from 30:60 and 30:90.

3. The microfluidic system of claim 1, wherein actuation of the IDT further lyses the particle.

4. The microfluidic system of claim 1, wherein the surface acoustic wave produced by the IDT refracts from fluid in the dispersion phase fluidic channel at a Rayleigh angle.

5. The system of claim 4, wherein the surface acoustic wave forces the fluid from the dispersion phase fluidic channel through the aperture into the continuous phase fluidic channel at the Rayleigh angle.

6. The microfluidic system of claim 1, further comprising an optical system to detect the presence of a particle in the dispersion phase fluidic channel.

7. The microfluidic system of claim 6, further comprising a controller to actuate the IDT upon detection of the particle by the optical system.

8. The microfluidic system of claim 7, wherein the controller is configured to supply a pulse of power to the IDT having a pulse length in a range from 25 microseconds to 100 microseconds.

9. The microfluidic system of claim 1, wherein the injected fluid from the dispersion phase fluidic channel is injected into a pre-existing droplet of fluid passing through the continuous phase fluidic channel.

10. The microfluidic system of claim 1, wherein the substrate is a piezoelectric substrate.

11. The microfluidic system of claim 1, wherein a polar fluid flows in the dispersion phase fluidic channel and a non-polar fluid flows in the continuous phase fluidic channel.

12. The microfluidic system of claim 1, wherein the injected fluid forms a droplet in the continuous phase fluidic channel having a diameter in a range from 20 micrometers to 70 micrometers.

13. A method of sorting a particle population, comprising:
    flowing a stream of particles in a dispersion phase fluidic channel that is formed in a substrate;
    detect a particle of interest in the stream of particles; and
    actuating an interdigital transducer (IDT) in contact with the substrate to generate a surface acoustic wave and inject a volume of fluid including the particle of interest from the dispersion phase fluidic channel into a continuous phase fluidic channel through an aperture by actuating an interdigital transducer (IDT) in contact with the substrate and configured to generate a surface acoustic wave,
    wherein a channel height of the dispersion phase fluidic channel is less than a channel height of the continuous phase fluidic channel, and
    wherein injecting the volume of fluid encapsulates and shifts a location of the particle of interest from the dispersion fluid channel to the continuous phase fluidic channel.

14. The method of claim 13, wherein a ratio of the channel height of the dispersion phase fluidic channel to the channel height of the continuous phase fluidic channel is in a range from 30:60 and 30:90.

15. The method of claim 13, further comprising lysing the particle of interest using the surface acoustic wave.

16. The method of claim 13, wherein actuating the IDT refracts the surface acoustic wave from fluid in the dispersion phase fluidic channel at a Rayleigh angle.

17. The method of claim 13, wherein injecting the volume of fluid further comprises injecting the volume of fluid into a pre-existing droplet of fluid passing through the continuous phase fluidic channel.

18. The method of claim 13, wherein flowing the stream of particles includes flowing the stream of particles in a polar fluid and wherein injecting the volume of fluid includes injecting the volume of fluid into a stream of non-polar fluid in the continuous phase fluidic channel.

19. The method of claim 13, wherein injecting the volume of fluid includes producing a droplet containing the particle of interest, the droplet having a droplet diameter in a range from 20 micrometers to 70 micrometers.

20. The method of claim 13, wherein detecting the particle of interest comprises detecting the presence of the particle of interest in the dispersion phase fluidic channel using an optical system.

21. The method of claim 13, wherein actuating the IDT comprises using a controller to actuate the IDT upon detection of the particle.

22. The method of claim 21, wherein the controller supplies a pulse of power to the IDT having a pulse length in a range from 25 microseconds to 100 microseconds.

\* \* \* \* \*